United States Patent
Recchia

(10) Patent No.: US 10,745,900 B2
(45) Date of Patent: Aug. 18, 2020

(54) CATCH BASIN TRAP WITH FLEXIBLE OUTLET PIPE CONNECTOR

(71) Applicant: DECAST LTD., Utopia (CA)

(72) Inventor: Mario Recchia, Toronto (CA)

(73) Assignee: Decast Ltd. (CA)

( * ) Notice: Subject to any disclaimer, the term of this patent is extended or adjusted under 35 U.S.C. 154(b) by 0 days.

(21) Appl. No.: 16/113,414

(22) Filed: Aug. 27, 2018

(65) Prior Publication Data

US 2019/0078309 A1     Mar. 14, 2019

(30) Foreign Application Priority Data

Sep. 14, 2017 (CA) .................................... 2979153

(51) Int. Cl.
| | | |
|---|---|---|
| *E03F 5/14* | (2006.01) | |
| *E03F 5/04* | (2006.01) | |
| *E03F 5/16* | (2006.01) | |
| *E03F 1/00* | (2006.01) | |
| *E03F 5/10* | (2006.01) | |
| *B01D 21/24* | (2006.01) | |

(52) U.S. Cl.
CPC ........ *E03F 5/0404* (2013.01); *B01D 21/2444* (2013.01); *E03F 1/002* (2013.01); *E03F 5/0403* (2013.01); *E03F 5/106* (2013.01); *E03F 5/14* (2013.01); *E03F 5/16* (2013.01); *E03F 2005/0414* (2013.01)

(58) Field of Classification Search
CPC ....... E03F 5/0403; E03F 5/0405; E03F 5/106; E03F 5/14; E03F 5/16; E03F 2005/0414; B01D 21/2444; F16L 21/005; F16L 27/10; F16L 27/107

USPC ...... 210/170.03, 532.1, 538, 747.2; 285/235, 285/236
See application file for complete search history.

(56) References Cited

U.S. PATENT DOCUMENTS

| | | |
|---|---|---|
| 142,671 A | 9/1873 | Boschen |
| RE5,920 E | 6/1874 | Meyer |
| (Continued) | | |

FOREIGN PATENT DOCUMENTS

| | | |
|---|---|---|
| CA | 717806 | 9/1965 |
| CA | 730502 | 3/1966 |

*Primary Examiner* — Christopher Upton
(74) *Attorney, Agent, or Firm* — Fox Rothschild LLP

(57) ABSTRACT

A catch basin trap for mounting in an opening in a side wall of a catch basin. A preferred catch basin trap has a body with a front side for facing outwardly to outside of the catch basin, and a back side for facing inwardly to inside of the catch basin. An inlet opening is provided in the back side of the body for receiving drainage water from inside of the catch basin. An outlet opening is provided in the front side of the body for discharging the drainage water to the outside of the catch basin. A flexible outlet pipe connector extends outwardly from the outlet opening, configured for watertight coupling to an outlet pipe positioned outside of the catch basin. The catch basin trap provides a water flow path for drainage water from inside of the catch basin to the outlet pipe. A preferred outlet pipe connector is adapted to facilitate installation of the catch basin trap by allowing watertight coupling to the outlet pipe at a plurality of angles and positions relative to the catch basin trap, and to accommodate angular and transpositional deviations of the outlet pipe resulting from settling of the ground after installation.

39 Claims, 18 Drawing Sheets

(56) References Cited

U.S. PATENT DOCUMENTS

| | | | |
|---|---|---|---|
| 459,440 A | 9/1891 | Coleman | |
| 522,351 A | 7/1894 | Phillips | |
| 788,721 A | 5/1905 | Johnson | |
| 1,035,480 A | 8/1912 | Schodde | |
| 1,237,068 A | 8/1917 | Loeb | |
| 1,654,247 A | 12/1927 | Egan | |
| 1,654,803 A | 1/1928 | Griffith | |
| 1,693,977 A | 12/1928 | Egan | |
| 1,758,318 A | 5/1930 | Hayley | |
| 1,889,601 A | 11/1932 | Heinkel | |
| 2,086,154 A | 6/1937 | Boggs | |
| 2,263,259 A | 11/1941 | Boosey | |
| 2,550,400 A | 4/1951 | Boosey | |
| 2,550,401 A | 4/1951 | Boosey | |
| 2,745,510 A | 5/1956 | Hultgren | |
| 2,749,303 A | 6/1956 | Sitton | |
| 3,357,593 A | 12/1967 | Sears, Jr. et al. | |
| 3,465,529 A | 9/1969 | Helle | |
| 3,516,571 A | 6/1970 | Roper et al. | |
| 3,727,953 A | 4/1973 | Martin et al. | |
| 3,789,987 A * | 2/1974 | Malaspina | E03F 5/0405 |
| | | | 210/533 |
| 3,944,124 A | 3/1976 | Hexel | |
| 4,140,828 A | 2/1979 | Copping | |
| 4,261,823 A | 4/1981 | Gallagher et al. | |
| 4,522,533 A | 6/1985 | Campbell et al. | |
| 4,763,695 A * | 8/1988 | Dooley | F16L 21/005 |
| | | | 285/236 |
| 4,793,728 A | 12/1988 | Ellis | |
| 4,846,510 A | 7/1989 | Mikol | |
| 4,874,192 A | 10/1989 | Key | |
| 5,101,849 A | 4/1992 | Richard | |
| 5,372,714 A | 12/1994 | Logue, Jr. | |
| 5,433,845 A | 7/1995 | Greene et al. | |
| 5,575,925 A | 11/1996 | Logue, Jr. | |
| 5,683,577 A | 11/1997 | Nurse, Jr. | |
| 5,746,911 A | 5/1998 | Pank | |
| 5,753,115 A | 5/1998 | Monteith | |
| 5,820,762 A | 10/1998 | Bamer et al. | |
| 5,849,181 A | 12/1998 | Monteith | |
| 5,980,740 A | 11/1999 | Harms et al. | |
| 6,126,817 A | 10/2000 | Duran et al. | |
| 6,132,603 A | 10/2000 | Mokrzycki et al. | |
| 6,394,505 B1 * | 5/2002 | Schmucki | F16L 25/14 |
| | | | 285/236 |
| 6,749,736 B1 | 6/2004 | Fuhr et al. | |
| 6,749,746 B2 | 6/2004 | Mokrzycki | |
| 7,686,961 B1 | 3/2010 | Glynne | |
| 8,161,711 B2 | 4/2012 | Steed et al. | |
| 2004/0031802 A1 | 2/2004 | Parodi | |
| 2015/0114503 A1 | 4/2015 | Fallot et al. | |
| 2016/0116090 A1 | 4/2016 | Poyser | |

\* cited by examiner

CATCH BASIN TRAP WITH FLEXIBLE OUTLET PIPE CONNECTOR

CROSS-REFERENCE TO RELATED APPLICATIONS

This patient application claims priority under 37 CFR 1.55 and 35 USC 119(b) to Canadian Patent Application No.: 2,979,153, filed Sep. 14, 2017, titled "Catch Basin Trap with Flexible Outlet Pipe Connector," filed in the name of Applicant DECAST LTD.

STATEMENT REGARDING FEDERALLY-SPONSORED RESEARCH OR DEVELOPMENT

Not applicable.

FIELD OF THE INVENTION

The present invention relates to the field of catch basins. More particularly, the present invention relates to a trap for the outlet of a catch basin, which is mountable in an opening formed in the side wall of the catch basin.

BACKGROUND OF THE INVENTION

Catch basins are large concrete structures buried in the ground and used to collect drainage water. They typically have an opening in one side wall to which may be coupled an outflow or outlet pipe of a drainage system. A trap is often provided at the opening in order to prevent floating pollutants, such as gas, oil, leaves and branches, from entering the outlet pipe and possibly plugging the pipe. Such catch basin traps may also provide a water "plug" for preventing sewer gases from entering the catch basin from the outlet pipe. This reduces offensive odors in the area of the catch basin. Such catch basin traps are typically associated with the side wall of a catch basin. They generally have an inlet for receiving drainage water from the interior of the catch basin, an outlet for passing the drainage water to an outlet pipe located outside of the catch basin, and a pathway for the drainage water between the inlet and the outlet.

Typically, a rigid connector is provided at the outlet for coupling to the outlet pipe. Such an outlet pipe connector is often formed integrally with the body of the catch basin trap, and so is made from the same rigid material as the rest of the catch basin trap. The outlet pipe connector is typically adapted to slidably receive the inlet end of the outlet pipe therearound with a sealing friction fit, and the coupling is maintained by the ground that is put over the outlet pipe during installation. Catch basin traps are often configured with outlet pipe connectors that will extend perpendicular to the side wall of the catch basin when installed. In some cases catch basin traps are configured with outlet pipe connectors which are angled downwards for mating with downwardly angled outlet pipes.

Generally speaking, prior art catch basin traps tend to work well when installed properly and as intended by the manufacturer, however, they may be prone to failure when installed improperly. For example, in installations of such prior art catch basin traps where the ground has not been properly prepared and compacted prior to setting the catch basin and/or laying the outlet pipe, the outlet pipe and/or the catch basin may move relative to one another as the ground under one or both settles. This relative movement of the outlet pipe and/or the catch basin results in the outlet pipe becoming damaged or decoupled from the catch basin trap, or the pipe connecting section of the catch basin trap cracks, breaks or is sheared completely off of the catch basin trap. The result of any one of these failures is leakage of drainage water from inside the catch basin to outside of the catch basin into the ground at the location of the failed coupling between the outlet pipe and the catch basin trap.

Examples of prior art drains, catch basins, and catch basin traps include: U.S. Pat. Nos. 142,671; RE5,920; 459,440; 5,22,351; 788,721; 1,035,480; 1,237,068; 1,654,247; 1,654,803; 1,693,977; 1,758,318; 1,889,601; 2,086,154; 2,263,259; 2,550,400; 2,550,401; 2,745,510; 2,749,303; 3,789,987; 4,261,823; 4,522,533; 5,101,849; 5,433,845; 5,575,925; 5,372,714; 5,683,577; 5,746,911; 5,753,115; 5,820,762; 5,849,181; 5,980,740; 6,126,817, 6,132,603; 6,749,746; and 7,686,961; and Canadian Pat. Nos. 717,806; and 730,502.

Examples of prior art couplings used in other fields include: U.S. Pat. Nos. 3,465,529; 3,727,953; 4,793,728; 4,846,510; and 4,846,510; and U.S. Patent Publication Nos. 2015-0114503; and 2016-0116090.

Accordingly, there is a continuing need for improvements in catch basin traps. What is desired therefore, is a catch basin trap which overcomes at least the above described problem associated with prior art catch basin traps.

SUMMARY OF THE INVENTION

What is desired is an improved catch basin trap which will facilitate installation of catch basin traps, and/or mitigate problems associated with an improper installation leading to some movement of an outlet pipe or the catch basin relative to the other, during settling of the ground underneath, after the installation.

Accordingly, an embodiment of the present invention is directed to a catch basin trap having a relatively simple and inexpensive construction which may be mounted in an opening formed in a side wall of a catch basin, and watertight coupled to an outlet pipe positioned outside of the catch basin in a range of predetermined angles and/or positions relative to the catch basin trap.

The preferred catch basin trap has a flexible outlet pipe connector, extending outwardly from the outlet opening, which is adapted for watertight coupling to the outlet pipe. Preferably, the flexible outlet pipe connector is adapted to couple the catch basin trap to an outlet pipe positioned in a range of predetermined angles relative to the catch basin trap. As well, the preferred flexible outlet pipe connector may be adapted to accommodate an angular deviation of the outlet pipe resulting from movement of the pipe due to settling of the ground after the installation.

Similarly, the preferred flexible outlet pipe connector may also be adapted for watertight coupling to an outlet pipe having its inlet end located in a range of predetermined positions relative to the catch basin trap. Furthermore, the flexible outlet pipe connector may be adapted to accommodate a transpositional deviation of the outlet pipe resulting from movement of the pipe due to settling of the ground after the installation.

To accommodate the installation angles and positions of the outlet pipe relative to the catch basin trap, and potential deviations therefrom after installation, the flexible outlet pipe connector is deformable from a native shape adapted for the watertight coupling to the outlet pipe at a first angle or a first position relative to the catch basin trap, to a deformed shape adapted for the watertight coupling to the outlet pipe at a second angle or a second position relative to the catch basin trap. Accordingly, the preferred flexible outlet pipe connector may be formed from rubber, or rubber-like materials which allow the flexible outlet pipe connector to be deformed from its native shape to a deformed shape.

Therefore, in accordance with one aspect of the present intention, there is provided a catch basin trap for mounting in an opening in a side wall of a catch basin, said catch basin trap comprising:
- a body having a front side for facing outwardly to outside of said catch basin, and a back side for facing inwardly to inside of said catch basin, said body defining a chamber;
- an inlet opening in said back side of said body for receiving drainage water from said inside of said catch basin;
- an outlet opening in said front side of said body for discharging said drainage water to said outside of said catch basin;
- a flexible outlet pipe connector extending outwardly from said outlet opening, configured for watertight coupling to an outlet pipe positioned outside of said catch basin; and
- water flow path for said drainage water from said inside of said catch basin to said outlet pipe, passing through said inlet opening, said chamber, said outlet opening and said flexible outlet pipe connector.

In accordance with another aspect of the present invention, there is disclosed a method of installing a catch basin trap, said method comprising the steps of:
- providing a catch basin trap for mounting in a side wall of a catch basin, said catch basin trap having a body defining a chamber, said body comprising a front side for facing outwardly from said catch basin, a back side for facing inwardly to inside of said catch basin, and a flexible outlet pipe connector extending outwardly from said front side of said body, said flexible outlet pipe connector being configured for watertight coupling to an outlet pipe positioned outside of said catch basin;
- mounting said catch basin trap in said opening in said side wall of said catch basin, adjacent an inlet end of said outlet pipe;
- deforming said flexible outlet pipe connector from a native shape towards a deformed shape to align said outlet end of said flexible outlet pipe connector with said inlet end of said outlet pipe; and
- sliding said outlet end of said flexible outlet pipe connector over said inlet end of said outlet pipe to form said watertight coupling.

BRIEF DESCRIPTION OF THE DRAWINGS

Reference will now be made to the preferred embodiments of the present invention with reference, by way of example only, to the following drawings in which.

DETAILED DESCRIPTION OF THE PREFERRED EMBODIMENTS

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

Figure 6:
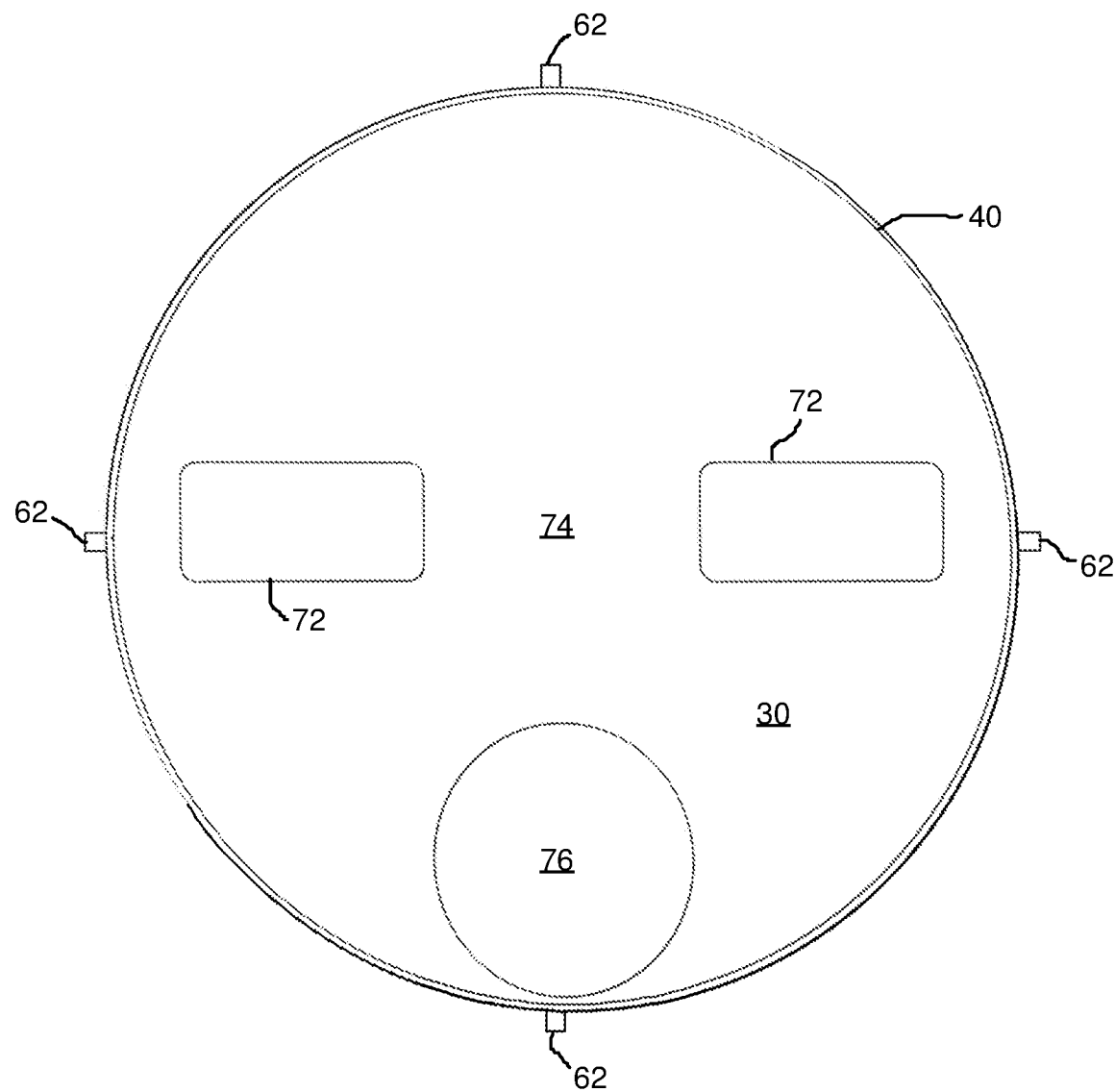
FIG. 6 is a front view the inner trap member of FIG. 2.
Figure 7:
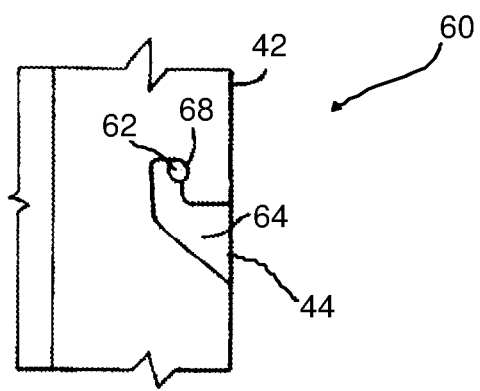
FIG. 7 is a partial view of one of a plurality of bayonet engagement mechanisms of the catch basin trap of FIG. 1.
Figure 8:
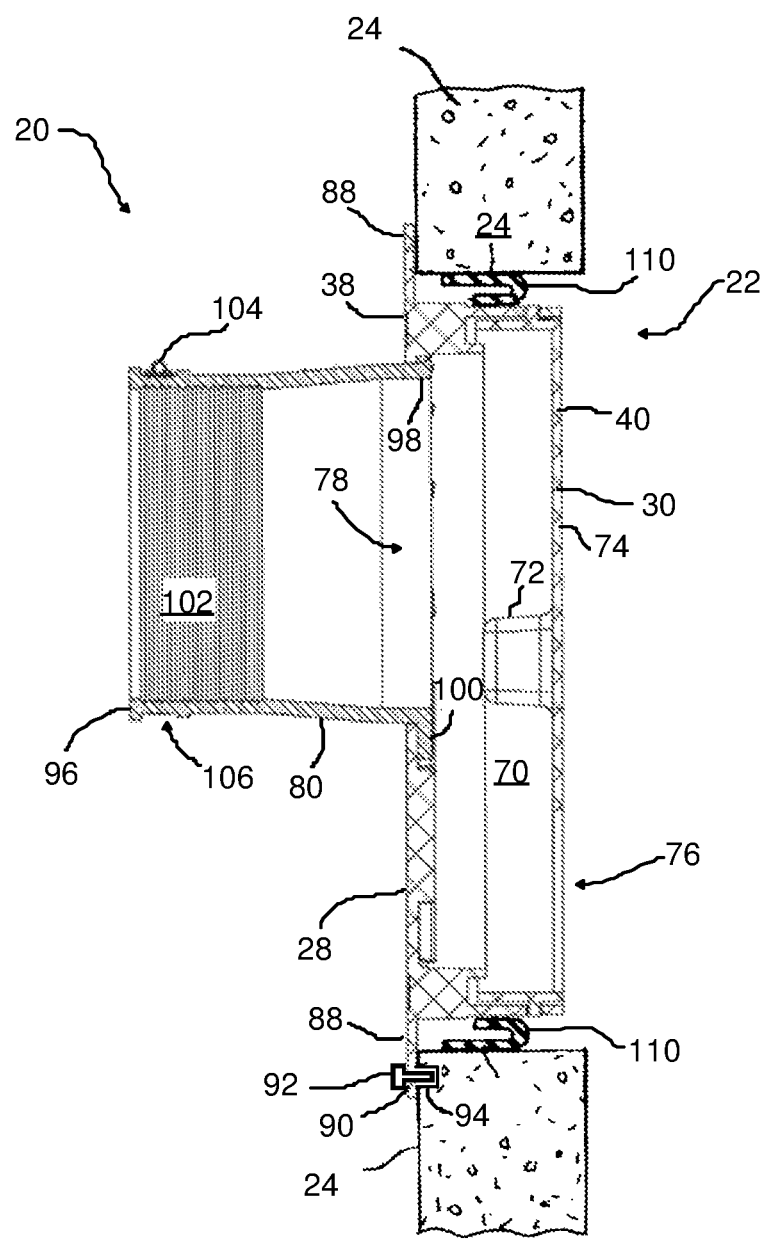
FIG. 8 is a cross-sectional view showing the catch basin trap of FIG. 1 mounted in an opening in a portion of a side wall of a catch basin.
Figure 9:
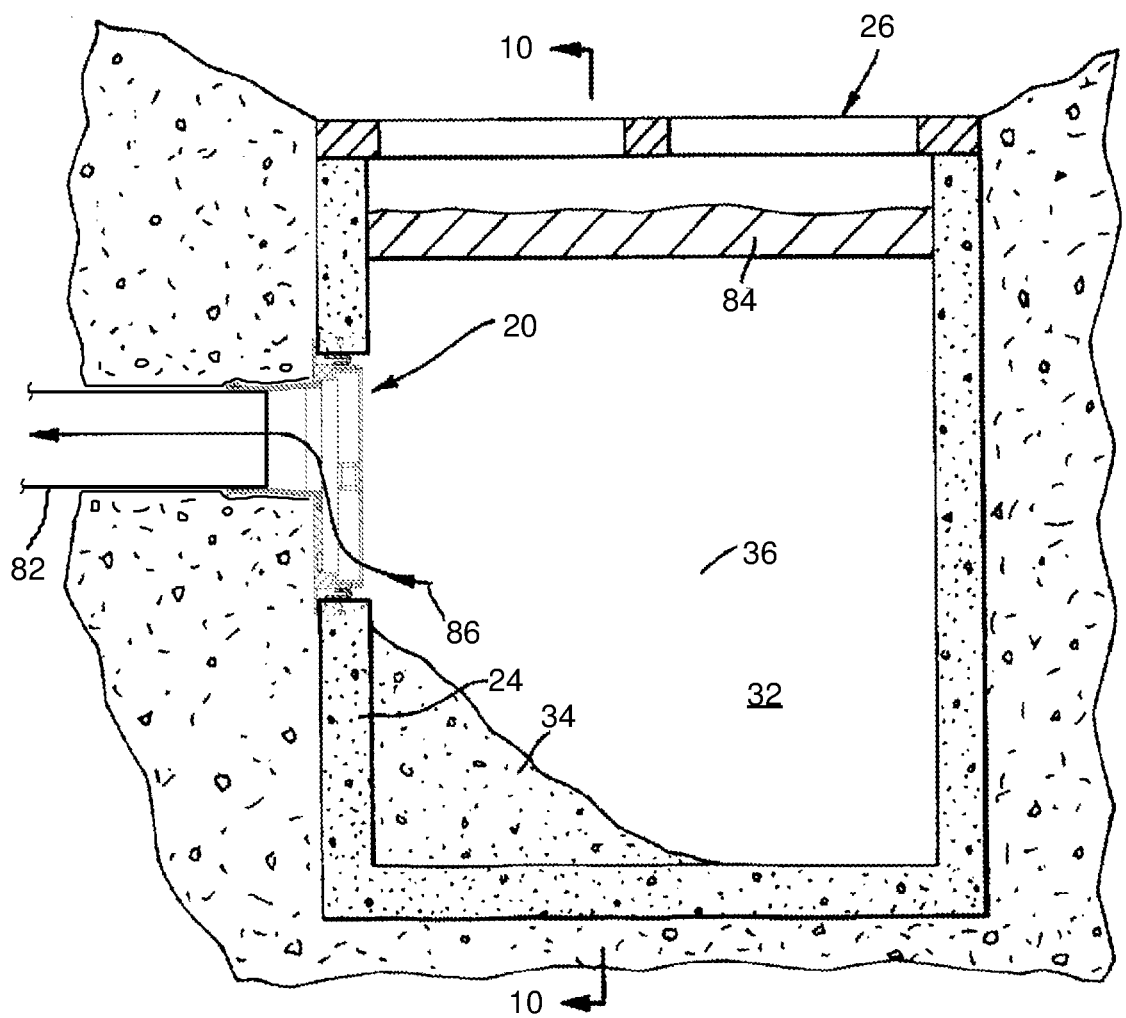
FIG. 9 is a cross-sectional view of an installation showing the catch basin trap of FIG. 1 mounted in the opening in the side wall of the catch basin, similar to FIG. 8, and connected to an outlet pipe, wherein the water level is at an upper limit.
Figure 10:
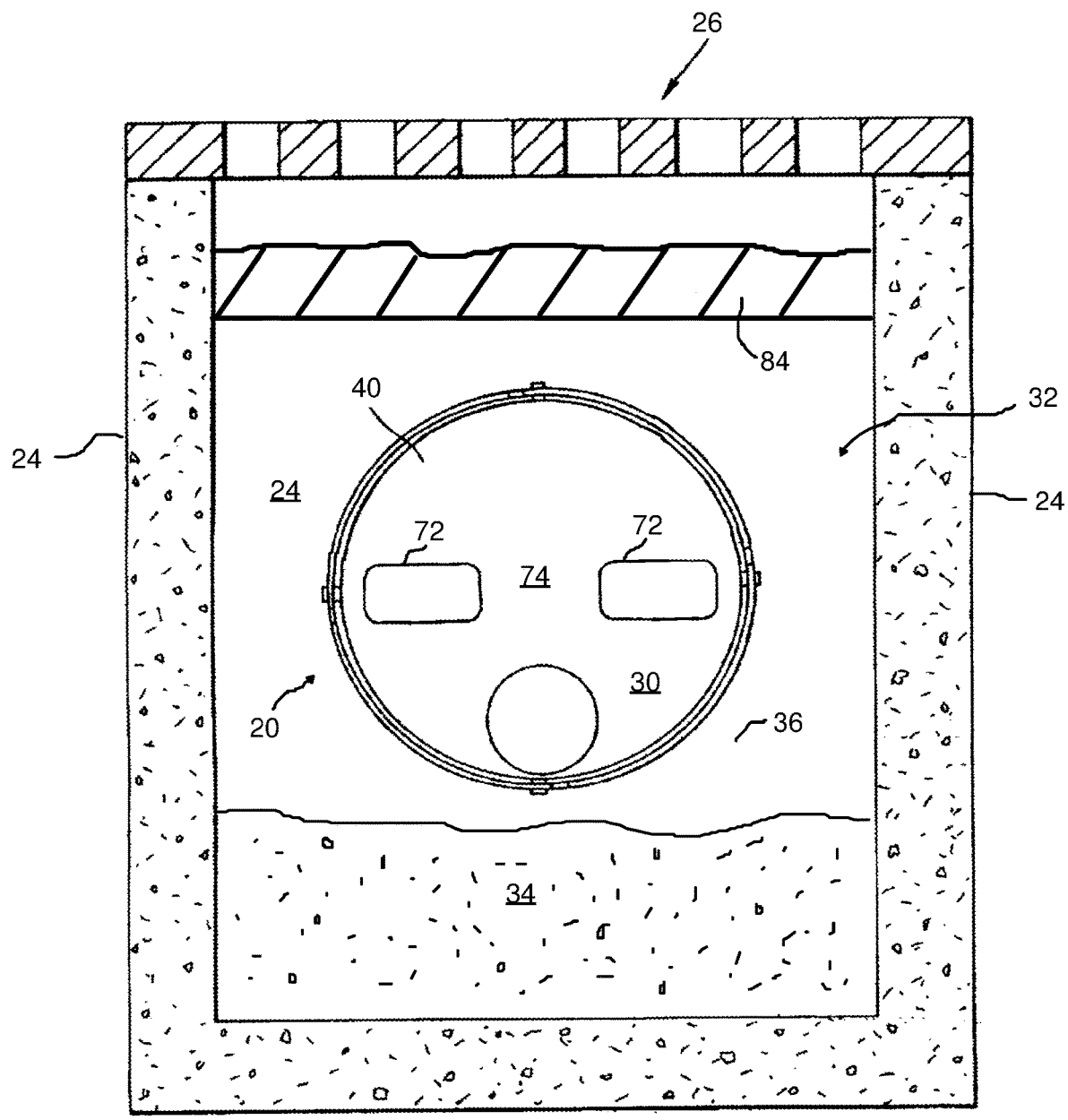
FIG. 10 is a view taken along line 10-10 of FIG. 9.

A catch basin trap 20 according to an embodiment of the present invention is shown in FIGS. 1 to 7. As indicated by FIGS. 8 to 10, the catch basin trap is configured to be sealingly mountable in an opening 22 in the side wall 24 of the catch basin 26, which has been formed by, for example, boring out the opening 22 using a coring machine after the catch basin 26 has been cast, or by molding the opening 22 during casting of the catch basin 26. The front 28 of the catch basin trap 20 faces outwardly from the catch basin 26, and the back 30 of the catch basin trap 20 faces inwardly to the inside 32 of the catch basin 26. The catch basin trap 20 facilitates the setting out of solid matter 34 such as sediment and debris carried by incoming drainage water 36 and reduces the amount of such solid matter 34 being carried out through the opening 22 in the side wall 24 of the catch basin 26.

Figure 1:
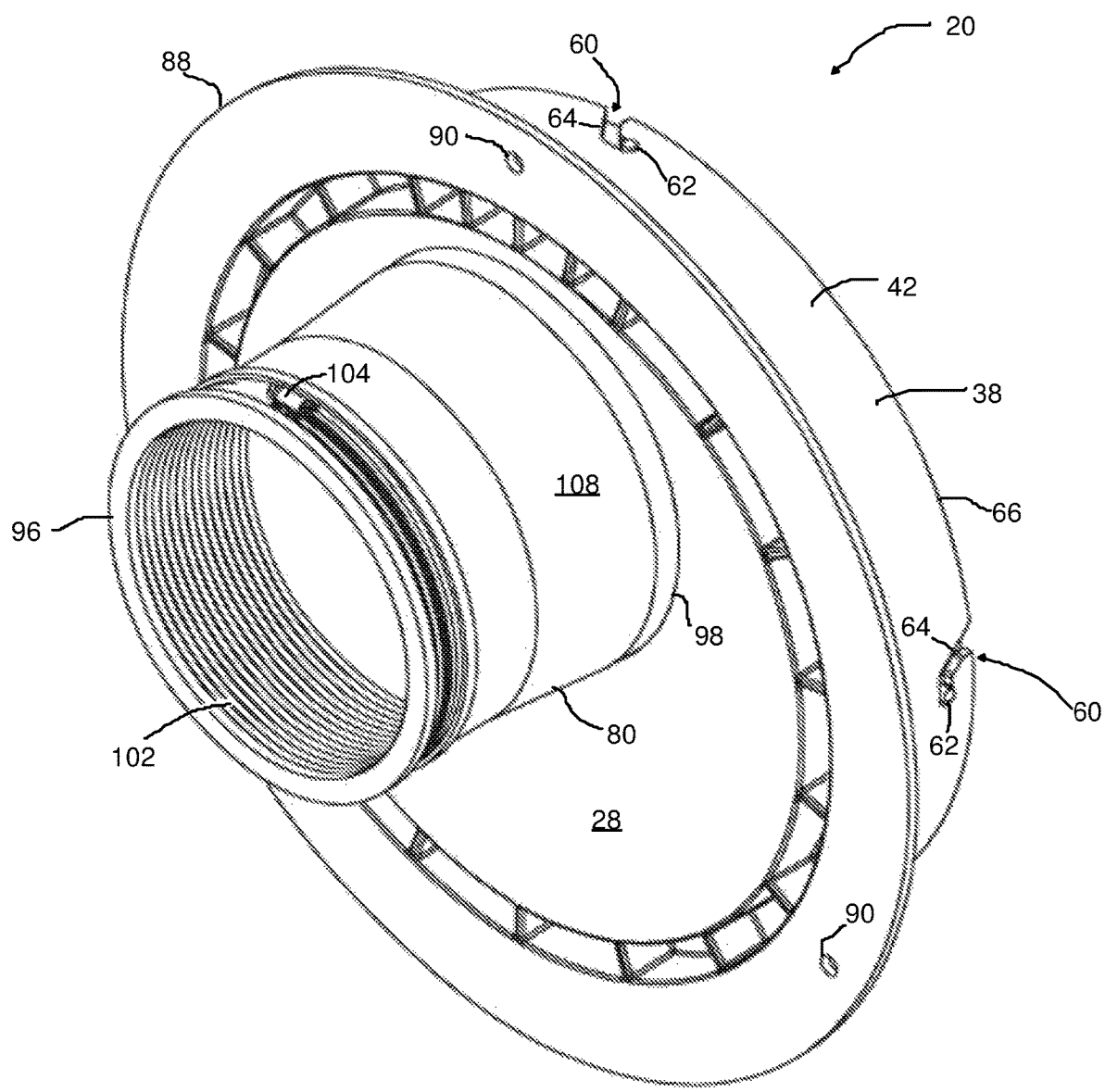
FIG. 1 is a perspective view of a catch basin trap according to an embodiment of the present invention.
Figure 2:
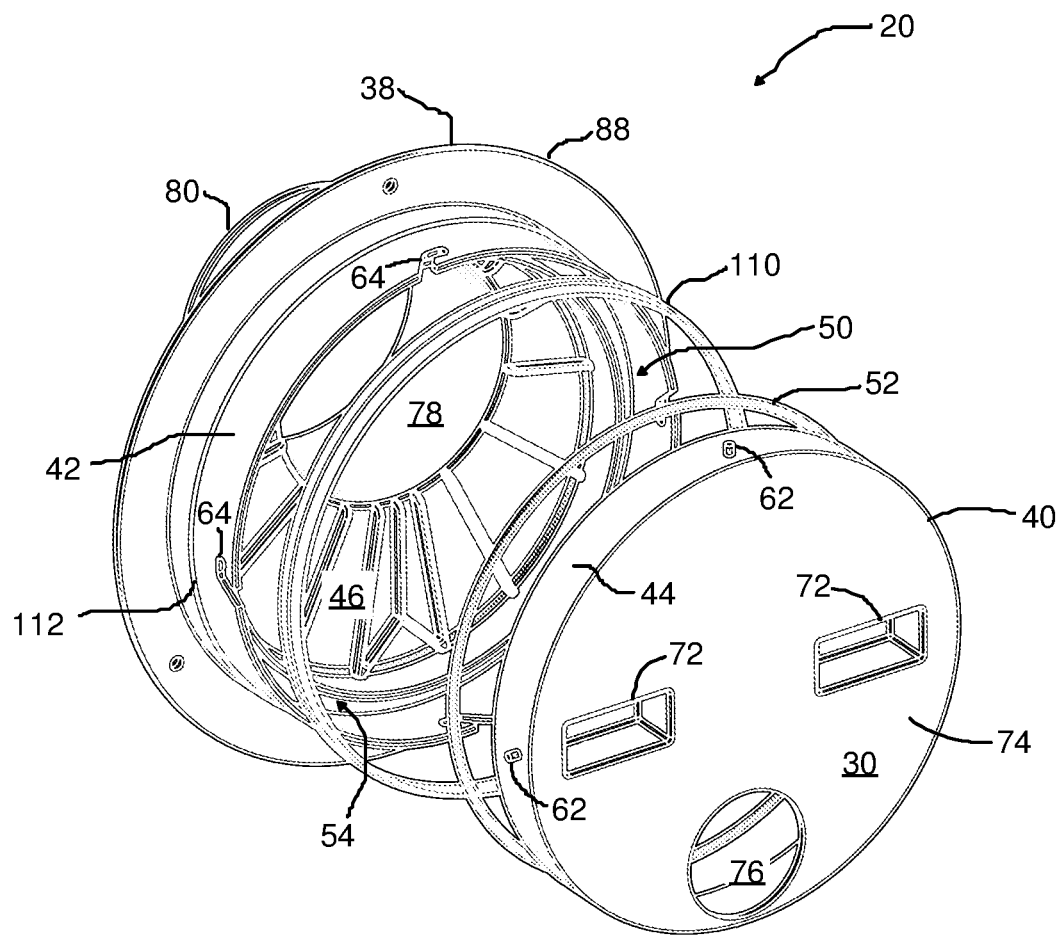
FIG. 2 is an exploded view of the catch basin trap of FIG. 1, showing an outer trap member, a first seal, a second seal, and an inner trap member.

Referring to FIGS. 1 and 2, the catch basin trap 20 has an outer trap member 38 and an inner trap member 40 which are secured together. Preferably, the outer and inner trap members 38,40 are each of a unitary construction and formed by injection molding using high density polyethylene.

As best seen in FIG. 2, the outer trap member 38 has an outer connecting wall 42, and the inner trap member 40 has an inner connecting wall 44. The outer and inner connecting walls 42,44 are integrally formed with, and extend perpendicularly away from back sides 46,48 of the respective outer and inner trap members 38,40. The inner connecting wall 44 of the inner trap member 40 is sized and positioned to fit inside the opening 50 defined by the outer connecting wall 42 of the outer trap member 38, such that the outer and inner connecting walls 42,44 overlap one another when the outer and inner trap members 38,40 are secured to one another.

Figure 4:
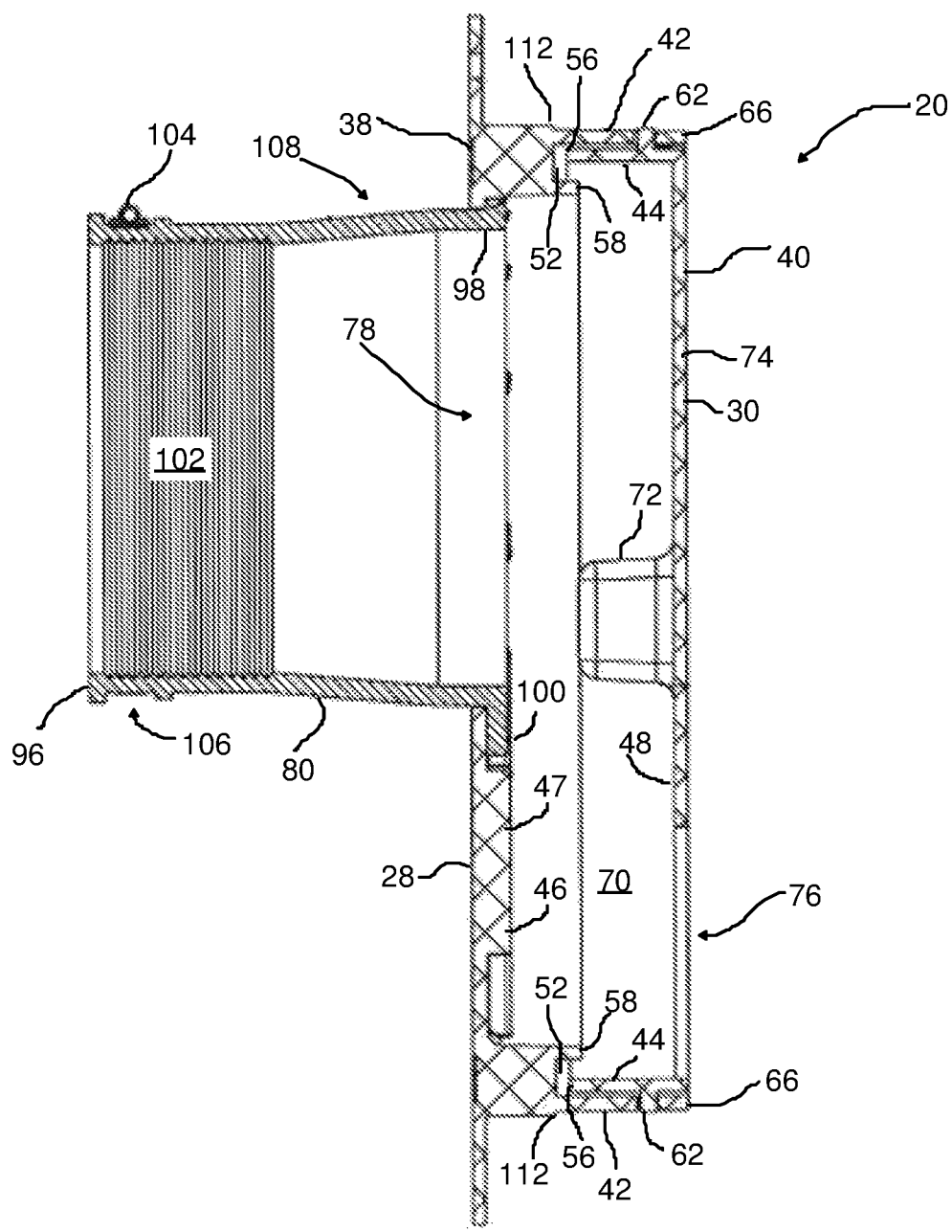
FIG. 4 is a cross-sectional view taken generally along line 4-4 of FIG. 3.

A first seal member 52 is positioned between the outer trap member 38 and the inner trap member 40 to effect a water tight seal. Good results have been obtained with a first seal member 52 made from rubber. Preferably, the first seal member 52 is held in place on the outer trap member 38 by a first seal retainer, which in this example is a groove or channel 54 formed in the back side 46 of the outer trap member 38. As best seen in FIG. 4, the channel 54 is positioned inwardly of the outer connecting wall 42 and configured to allow an edge 56 of the inner connecting wall 44 to press against the retained first seal member 52 when the inner trap member 40 is secured to the outer trap member 38. In this example, the channel 54 is defined by the outer connecting wall 42, and a lip 58 extending from the back side 46 of the outer trap member 38. The lip 58 is spaced inwardly from the outer connecting wall 42 a distance to provide a snug fit for the first seal member 52, sufficient to retain the first seal member 52 in place on the outer trap member 38.

Preferably, the inner trap member 40 may be secured to the outer trap member 38 by a plurality of pin and slot connections 60. In this example, there are four pins 62 extending from, and equally spaced around the inner connecting wall 44 of the inner trap member 40, and an equal number of corresponding slots 64 formed in the outer connecting wall 42 of the outer trap member 38. The slots 64 are formed in the free end 66 of the outer connecting wall 42 and are configured to receive respective pins 62 on the inner connecting wall 44 in a bayonet fit. This is best seen in FIG. 7 which shows one such pin and slot connection 60. In this way, the outer and inner trap members 38,40 can be releasably secured together by sliding the inner connecting wall 44 of the inner trap member 40 into the opening 50 defined by the outer connecting wall 42 of the outer trap member 38, aligning the pins 62 with the slots 64 and rotating the inner trap member 40 relative to the outer trap member 38 until the pins 62 reach the notched inward limits 68 of slots 64. The resilience of the first seal member 52 pushes against the edge 56 of the inner connecting wall 44 biasing the inner trap member 40 away from the outer trap member 38 to help maintain the pins 62 in the notches 68 of the slots 64, thereby maintaining the inner trap member 40 secured to the outer trap member 38. With the outer trap member 38 secured to the inner trap member 40, a chamber 70 is formed therebetween, as best seen in FIG. 4.

As best seen with reference to FIGS. 2, 6, and 10, the inner trap member 40 is preferably provided with a pair of handles 72 to allow a user to rotate the inner trap member 40 relative to the outer trap member 40 in order to fasten and unfasten the inner trap member 40 to and from the outer trap member 38. In this example, the handles 72 are recessed in the front side 74 of the inner trap member 40. Preferably, the handles 72 are sized and shaped to permit the user to unfasten the inner trap member 40 from the outer trap member 38, to gain access to the chamber 70 for cleaning, from outside of the catch basin 26, and to secure the inner trap member 40 to the outer trap member 38 once the chamber 70 has been cleaned. It is contemplated that the user may use a suitable implement which is rigid and comprises an elongated body with one end to be gripped by the user and an opposite end having a pair of spaced inserts configured to engage or mate with the handles 72. As will be appreciated, the elongate body will preferably be sized to be long enough to permit the user, standing outside of the catch basin 26, to insert the inserts into the handles 72 and rotate the inner trap member 40 to engage or disengage the pin and slot connections 60.

Figure 5:
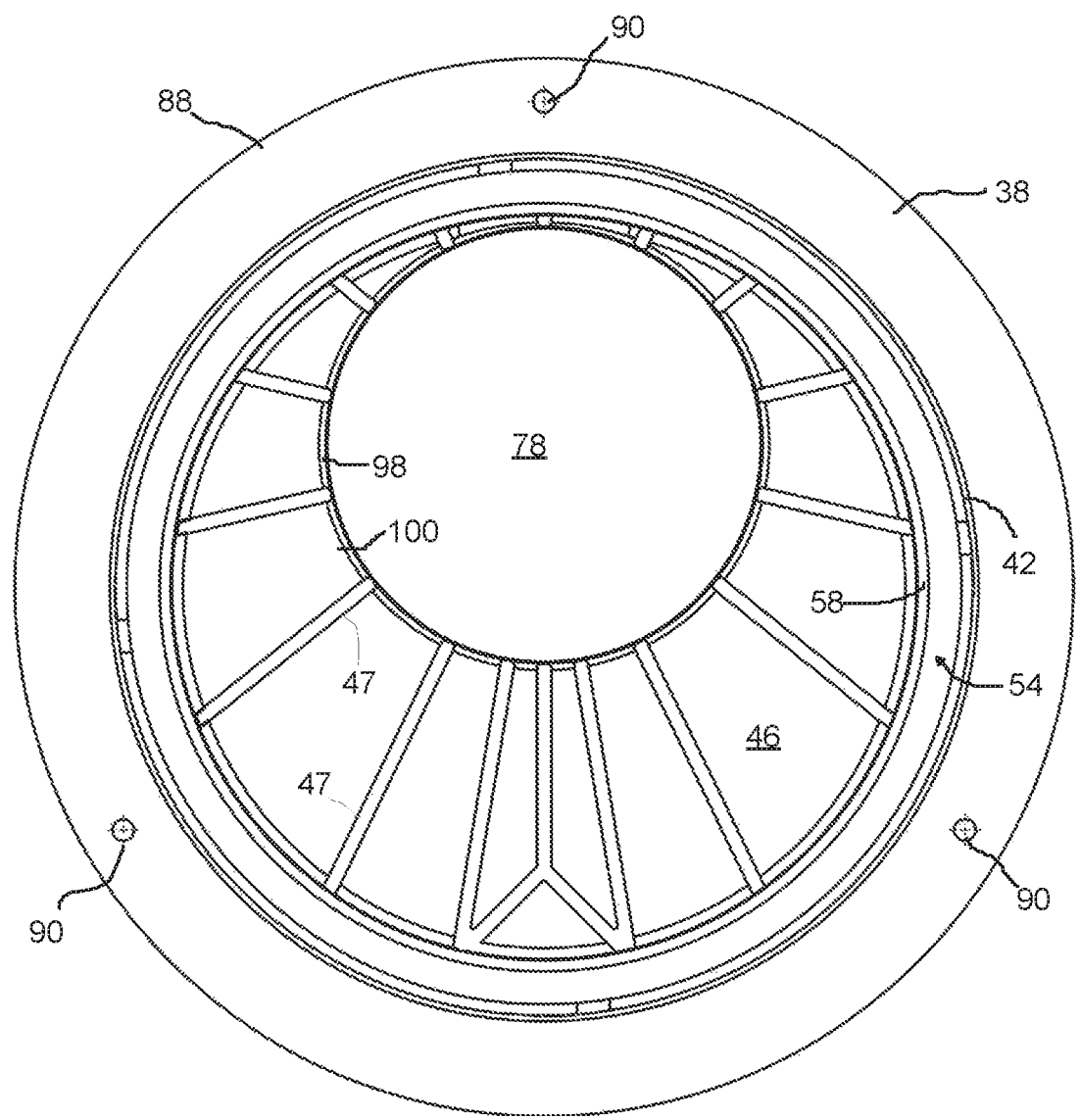
FIG. 5 is a rear view of the outer trap member of FIG. 2.

As best seen in FIG. 6, an inlet opening 76 is provided in the inner trap member 40 to allow drainage water 36 collected by the catch basin 26 to flow into the chamber 70. An outlet opening 78 is provided in the outer trap member 38, as best seen in FIG. 5 to allow the drainage water 36 in the chamber 70 to flow outside of the catch basin 26. Preferably, an outlet pipe connector 80 is associated with the outlet opening 78 to couple the outlet opening 78 of the catch basin trap 20 to an outlet pipe 82.

Figure 11:
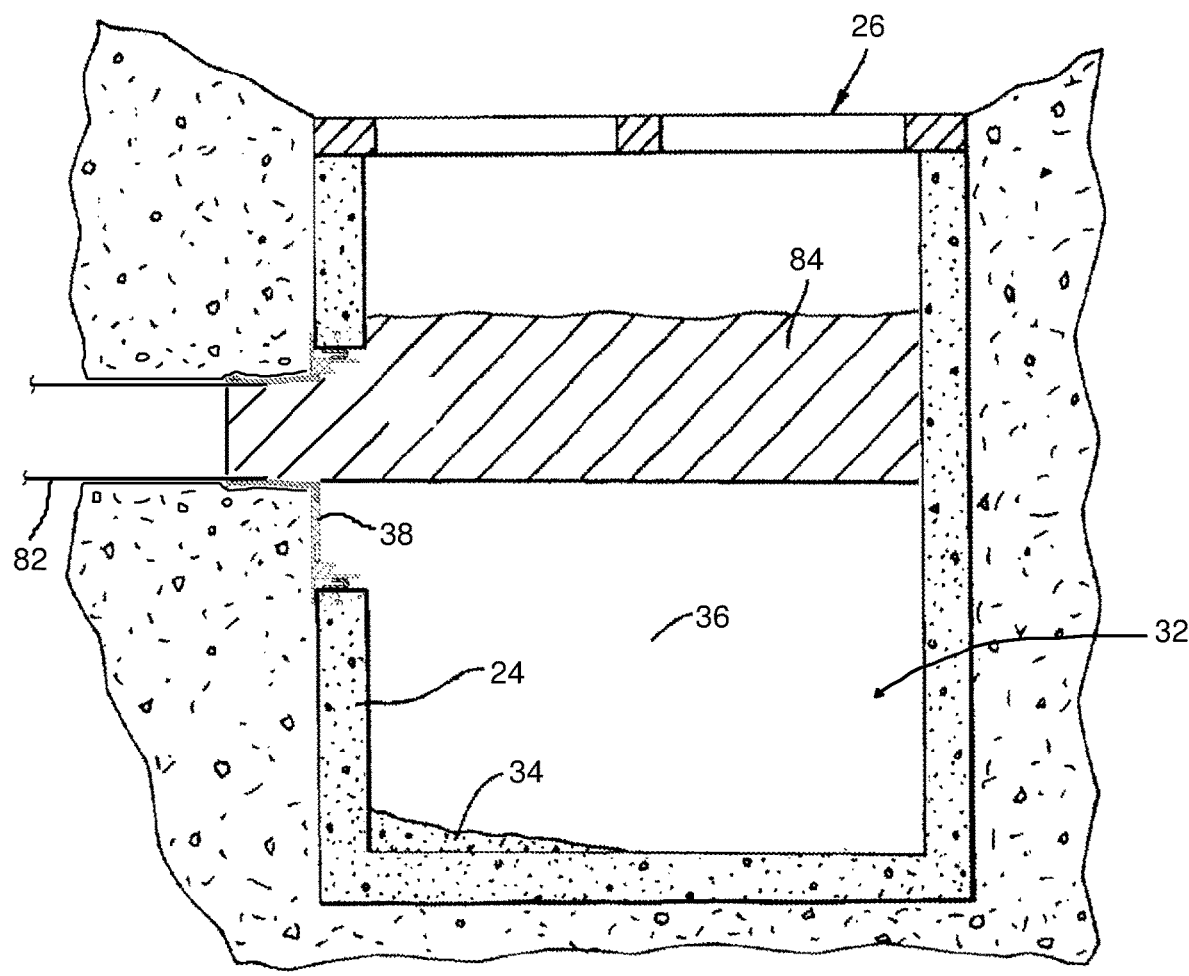
FIG. 11 is a cross-sectional view similar to FIG. 9, except that the inner trap member is removed from the catch basin trap.

The inlet opening 76 of the inner trap member 40 is preferably sized and shaped to significantly restrict water flow through the catch basin trap 20. In this regard, FIG. 11 shows the catch basin trap 20 with the inner trap member 40, which has the restrictive inlet opening 76, removed, so that drainage water 36 may flow unrestricted out of the catch basin 26 through the outlet pipe 82. FIG. 9, on the other hand, shows the catch basin trap 20 having the inner trap member 40 attached, and the inlet opening 76 of the inner trap member 40 functioning to restrict the water flow, causing the water level in the catch basin 26 to be elevated. Restricting the water flow through the catch basin trap 20 to elevate the water level in the catch basin 26 ensures that additional water draining into the catch basin 26 will travel a shorter distance and at a lower velocity upon impact with the drainage water 36 collecting in the catch basin 26. This results in reduced turbulence 84 in the collecting drainage water 36, which in turn promotes settlement of solid matter 34 in the catch basin 26. It also prevents previously settled matter 34 from becoming resuspended and carried out of the catch basin 26 with drainage water 36 flowing through the catch basin trap 20. Although the figures show the inlet opening 76 as being a circular shape, the inlet opening 76 need not be circular but may take other shapes such as, for example, square, rectangular, oval, etc. Depending on the shape selected, the cross-sectional area of the inlet opening 76 may be varied within certain parameters to achieve the desired water flow rates, as can be readily determined through simple experimentation.

To significantly restrict water flow through the catch basin trap 20, thereby raising the water level in the catch basin 26 and reducing turbulence 84, the inlet opening 76 preferably will have a diameter of 5.1 cm (i.e. a cross-sectional area of about 20.4 cm$^2$). In this preferred embodiment, the inlet opening 76 may be enlarged to a diameter of 12.7 cm (i.e. a cross-sectional area of about 126.7 cm$^2$). These inlet opening 76 diameters may be suitable for use with a 10 inch (about 25.4 cm) outlet pipe 82. The size of the inlet opening 76 may be selected based upon a number of factors including the diameter of the outlet pipe 82, the number of side wall openings 22 and catch basin traps 20 installed per catch basin 26, the size of the catch basin 26, and also on the number of catch basins 26 installed in a specified geographical area. In general, however, assuming that the catch basin 26 has a single side wall opening 22 with one catch basin trap 20 installed therein, a circular inlet opening 76 of the catch basin trap 20 preferably will not exceed about one half the diameter of the outlet pipe 82.

Furthermore, the inlet opening 76 is positioned on the inner trap member 40 so that it will be disposed lower than the outlet opening 78 of the outer trap member 38 when the catch basin trap 20 is assembled and mounted in the opening 22 of the side wall 24, as best seen in FIGS. 8 and 9. This arrangement defines a water flow path 86 extending from inside 32 of the catch basin 26, through the inlet opening 76, up through the chamber 70, outside of the catch basin 26 through the outlet opening 78, and into the outlet pipe 82 via the outlet pipe connector 80. As will be appreciated, locating the inlet opening 76 lower than the outlet opening 78 will maintain a column of drainage water 36 inside the chamber 70, to serve as a plug to prevent sewer gases from entering the catch basin 26 from the outlet pipe 82, thereby reducing offensive odors in the area of the catch basin 26. By way of example, the top of the inlet opening 76 of the catch basin trap 20 may be located about 7.09 cm (2.79 inches) lower than the bottom of the outlet opening 78 of the catch basin trap 20.

Figure 3:
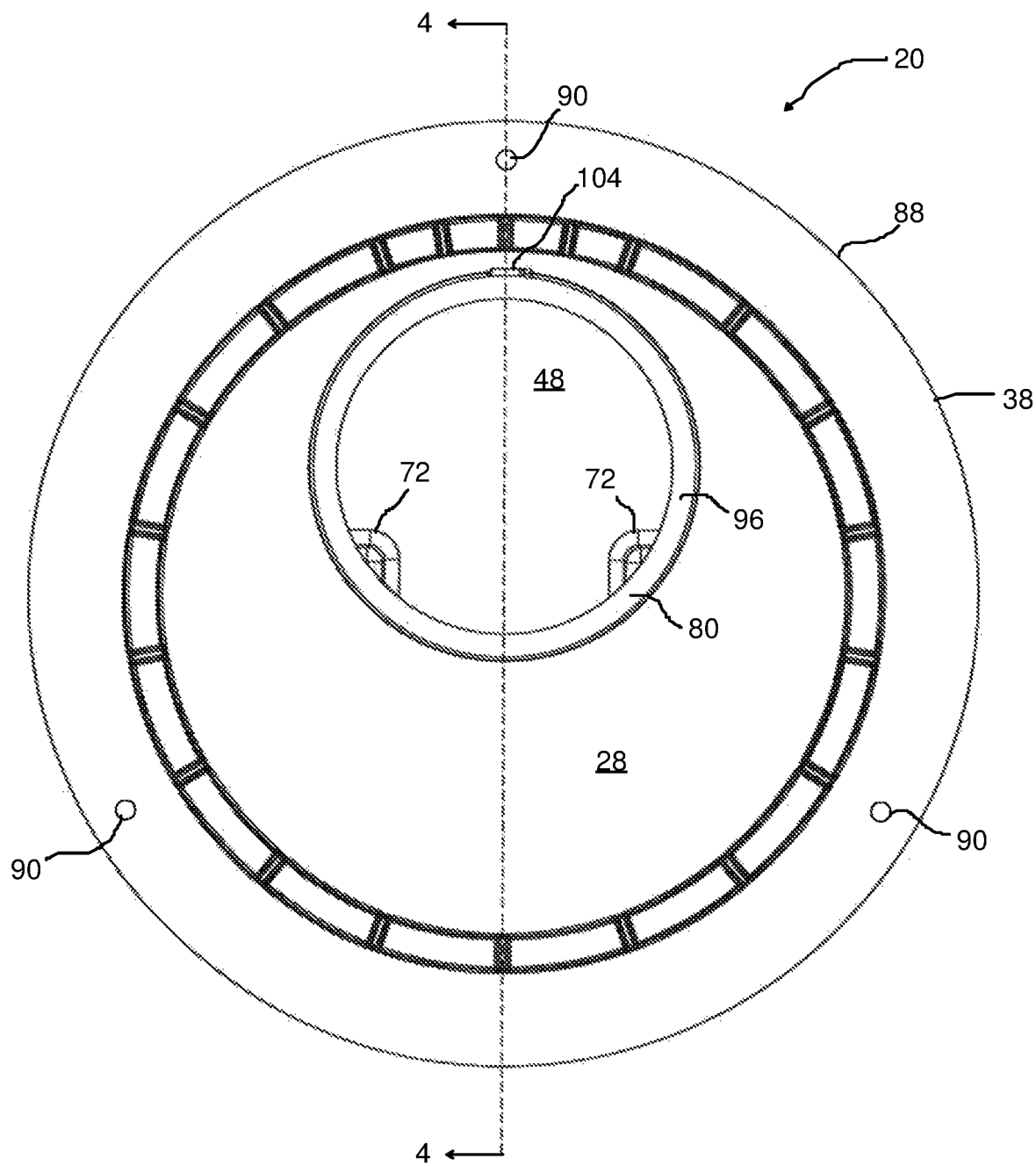
FIG. 3 is a front view of the catch basin trap of FIG. 1.

As mentioned above, a preferred outer trap member 38 has a front side 28 and a back side 46, an outer connecting wall 42 extending from its back side 46, and an outlet opening 78, which is associated with an outlet pipe connector 80 that extends outwardly from its front side 28. Preferably, the back side 46 includes reinforcing ribs 47 to strengthen the outer trap member 38. The slots 64 are formed in the free end 66 of the outer connecting wall 42, which as mentioned above are configured to receive respective pins 62 on the inner connecting wall 44 in a bayonet fit. Preferably, the outer trap member 38 also includes a mounting flange 88, which in this example is annular, extending radially outward from the outer connecting wall 42. The mounting flange 88 may include apertures 90 to allow fasteners 92 to be inserted therethrough to secure into suitably threaded anchors 94 mounted in the side wall 24 of the catch basin 26, thereby allowing the outer trap member 38 of the catch basin trap 20 to be secured in place in the opening 22 in the side wall 24 of the catch basin 26. By way of example, FIG. 3 shows three such apertures 90 being provided on the mounting flange 88, spaced equidistant from each other about the mounting flange 88 to better secure the catch basin trap 20 in place. However, more or fewer apertures 90 may be provided, or they may be omitted entirely, as described below. All such embodiments are comprehended by the present invention.

Preferably, the outlet opening 78 of the outer trap member 38 may be sized to match the inner cross-sectional area of the outlet pipe 82. Although the figures show the outlet opening 78 being a circular shape, the outlet opening 78 need not be circular but may take other shapes such as, for example, square, rectangular, oval, etc.

Furthermore, in some embodiments, the inner cross-sectional area of the outlet opening 78 may need to be larger than the inner cross-sectional area of the outlet pipe 82 in order to accommodate the outlet pipe connector 80, depending on how the outlet pipe connector 80 is associated with the outlet opening 78. By way of example, FIG. 4 shows the outlet pipe connector 80 attached to the outer trap member 38, through a circular outlet opening 78. According to this example, the outlet end 96 of the outlet pipe connector 80 is sized and shaped to match the outer diameter of a cylindrical outlet pipe 82, and the circular outlet opening 78 of the outer trap member 38 therefore needs to have a diameter that is larger than the inner diameter of the outlet pipe 82 in order to accommodate the larger outside diameter of the inlet end 98 of the outlet pipe connector 80.

Figure 12:
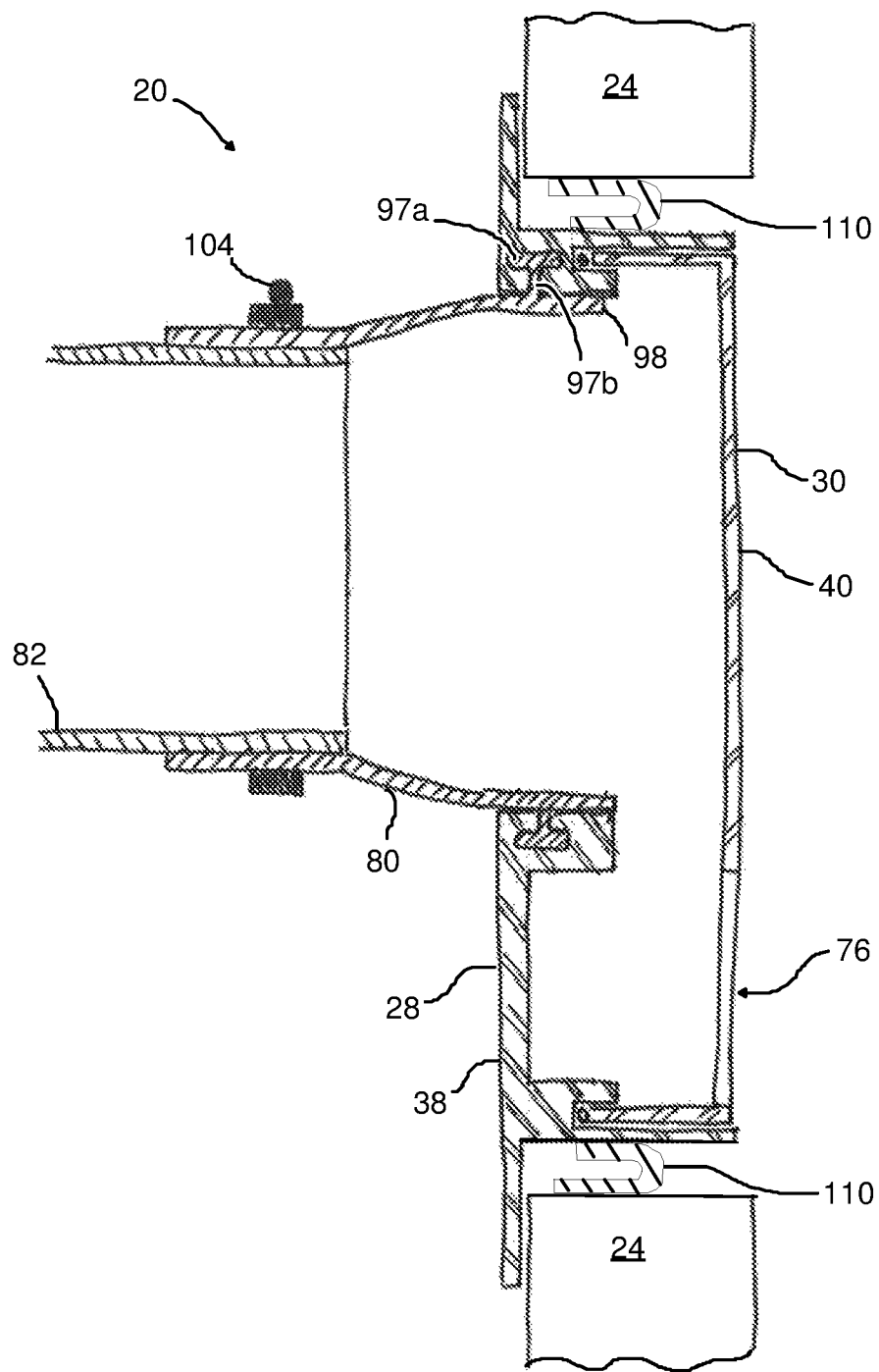
FIG. 12, is a cross-sectional view showing a catch basin tap according to another embodiment of the present invention, in which the outlet pipe connector is mechanically secured with a channel and tang connection.
Figure 13:
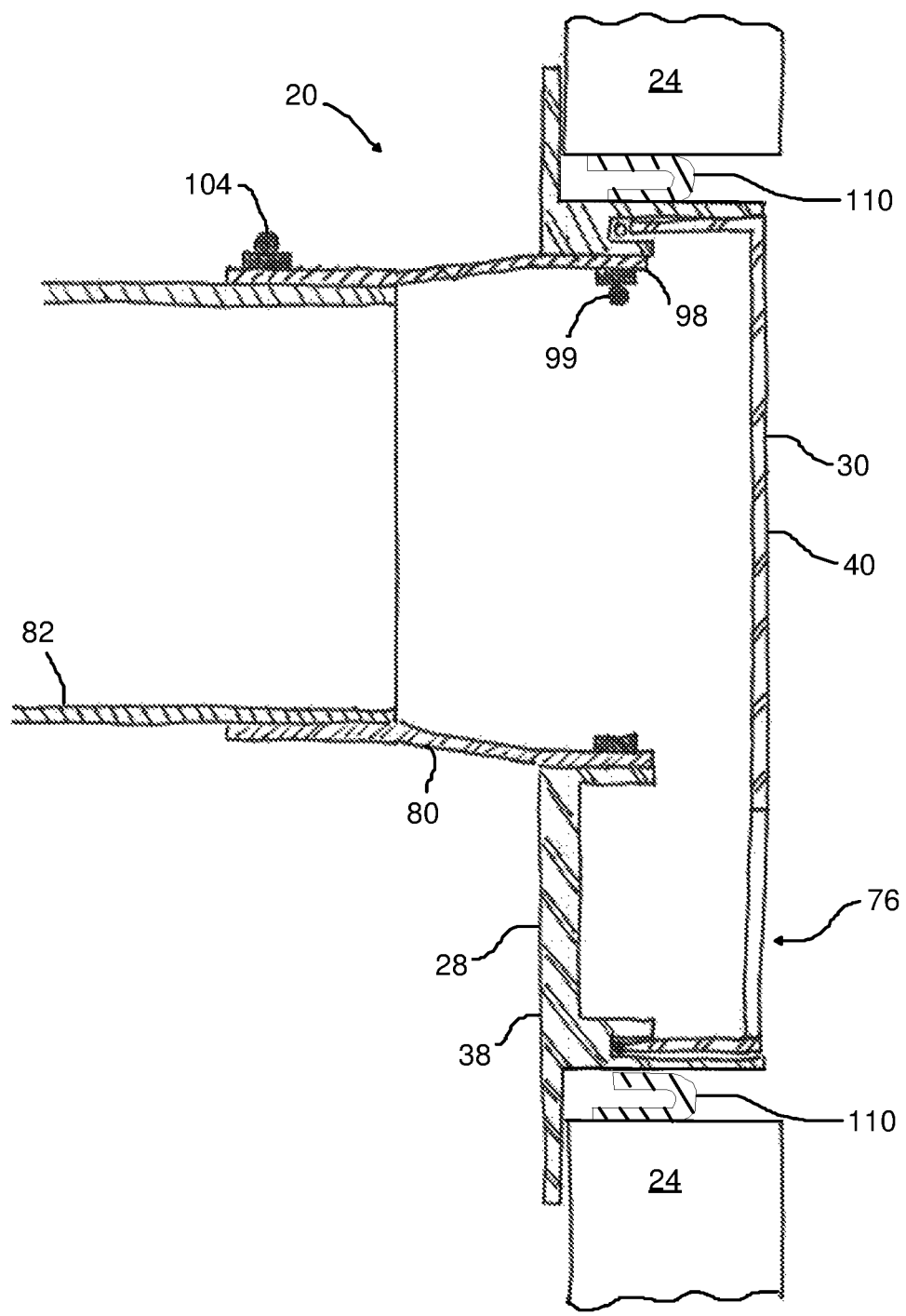
FIG. 13, is a cross-sectional view showing a catch basin tap according to another embodiment of the present invention, in which the outlet pipe connector is mechanically secured with an expandable ring gear clamp.
Figure 14:
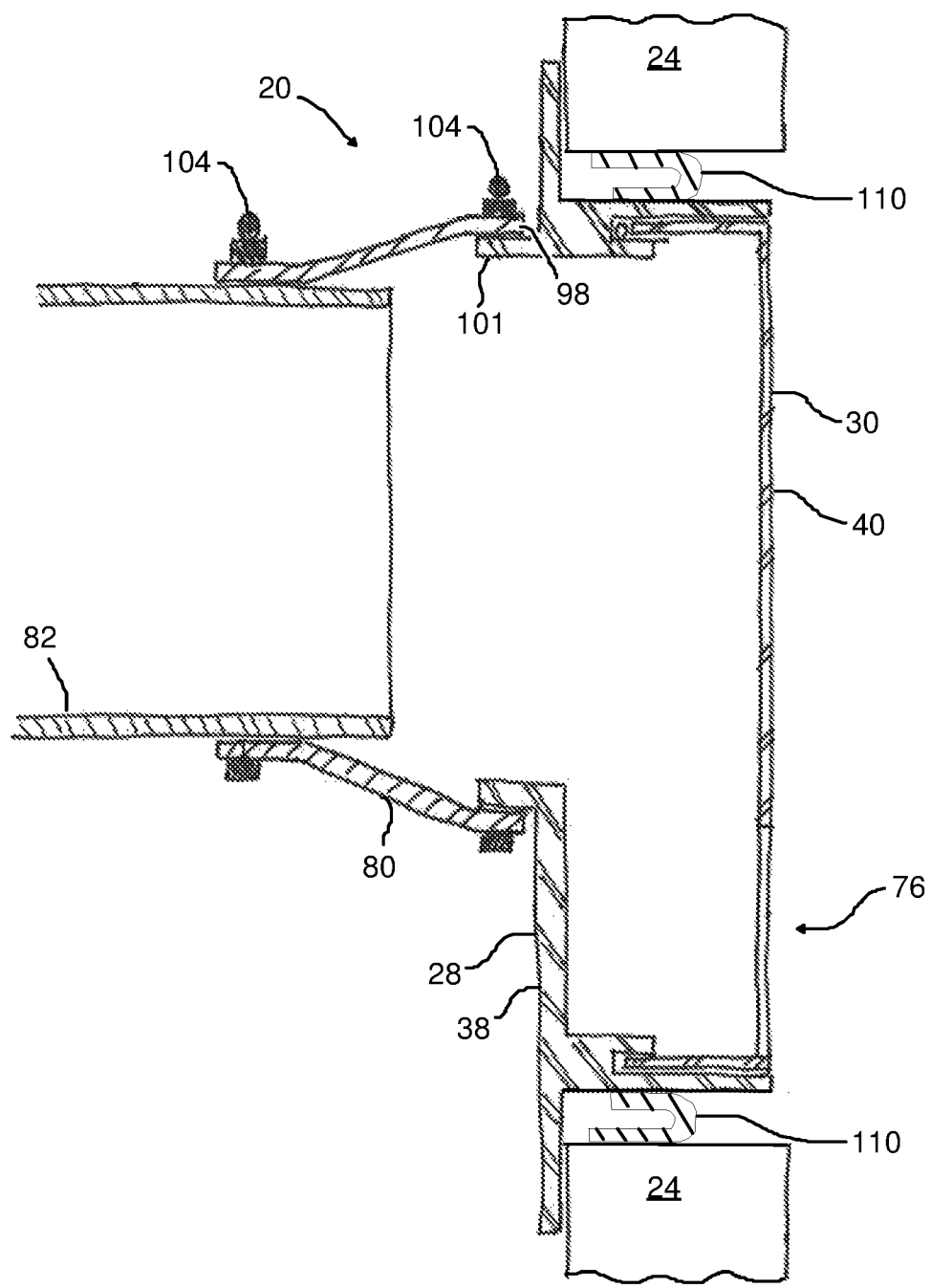
FIG. 14, is a cross-sectional view showing a catch basin tap according to another embodiment of the present invention, in which the outlet pipe connector is mechanically secured with a gear clamp.

In the example shown in FIG. 4, the inlet end 98 of the outlet pipe connector 80 has an annular flange 100 which may be sealingly bonded to the back side 46 of the outer trap member 38 using an adhesive, such as for example 3M® Rubber & Vinyl 80 Spray Adhesive, or similar. Alternately, instead of an adhesive, the outlet pipe connector 80 may be sealingly attached to the outer trap member 38 using a groove or channel 97a to grip a mating tang 97b at the inlet end 98, thereby mechanically securing the outlet pipe connector 80 to the outlet opening 78, as shown in FIG. 12. Alternately still, the outlet pipe connector 80 may be sealingly attached to the outer trap member 38 using an expandable ring gear clamp 99 to mechanically secure the inlet end 98 to the outlet opening 78, as shown in FIG. 13. Similarly, the outlet pipe connector 80 may be sealingly attached to the outer trap member 38 using a ring gear clamp 104 to mechanically secure the inlet end 98 to a lip 101 extending outwardly from the front side 28 of the outer trap member 38, about the outlet opening 78, as shown in FIG. 14. Preferably, the expandable ring gear clamps 99, and the ring gear clamps 104 may be made from 304 non-magnetic stainless steel.

As another example, the outlet pipe connector 80 may be co-molded with the outer trap member 38. According to this example, the cross-sectional area of the outlet end 96 of the outlet pipe connector 80 will be the same as the outlet opening 78, which will in turn be generally the same as the outer cross-sectional area of the outlet pipe 82.

With continued reference to FIG. 4, the preferred outlet pipe connector 80 extends outwardly from the front side 28 of the outer trap member 38 by about 7.6 inches. At its outlet end 96, the outlet pipe connector 80 is sized and shaped to receive the outlet pipe 82. A plurality of ridges 102 may be provided on the inner surface of the outlet pipe connector 80 at the outlet end 96 to grip the outlet pipe 82. Furthermore, a ring gear clamp 104 may be provided at the outlet end 96 of the outlet pipe connector 80 to help secure the coupling of the outlet pipe connector 80 to the outlet pipe 82. The ring gear clamp 104 may be retained in position at the outlet end 96 with a retaining groove or channel 106 formed in the outer surface of the outlet pipe connector 80. The outlet pipe connector 80 may be provided with a tapered section 108 extending from its inlet end 98 towards its outlet end 96. Preferably, the tapered section 108 may help to provide flexibility in the outlet pipe connector 80. While, the outlet pipe connector 80 is shown in this example as extending outwardly from, and perpendicular to the side wall 24 of the catch basin trap 20 for mating with a substantially level outlet pipe 82, it is contemplated that the outlet pipe connector 80 may be configured to extend outwardly at another angle, for example to better mate with an upwardly or downwardly angled outlet pipe 82. All such embodiments are comprehended by the present invention.

Figure 15:
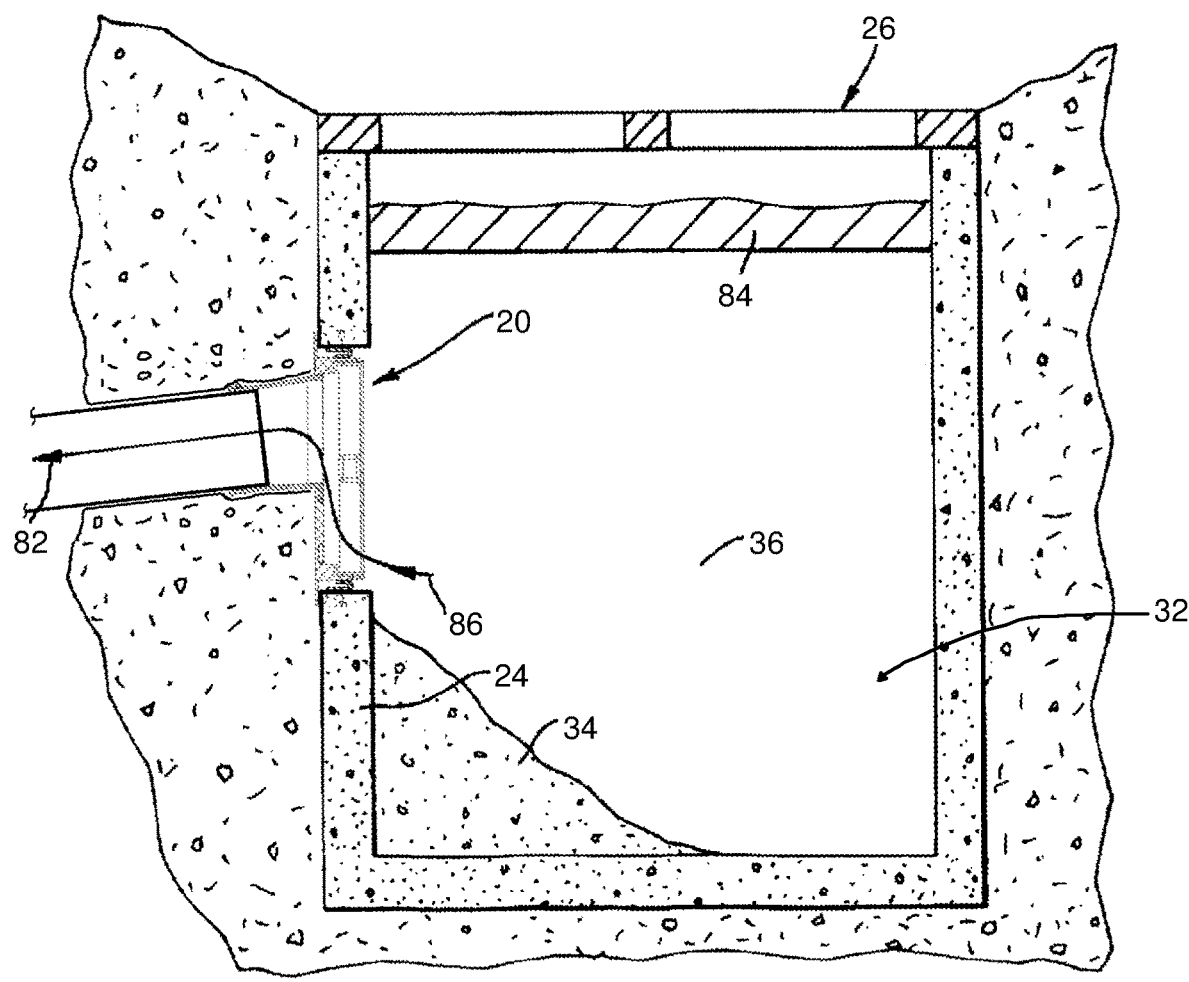
FIG. 15 is a cross-sectional view similar to FIG. 9, except that the outlet pipe is angled downwardly due to settlement of the soil around the outlet pipe due to an improper installation.
Figure 16:
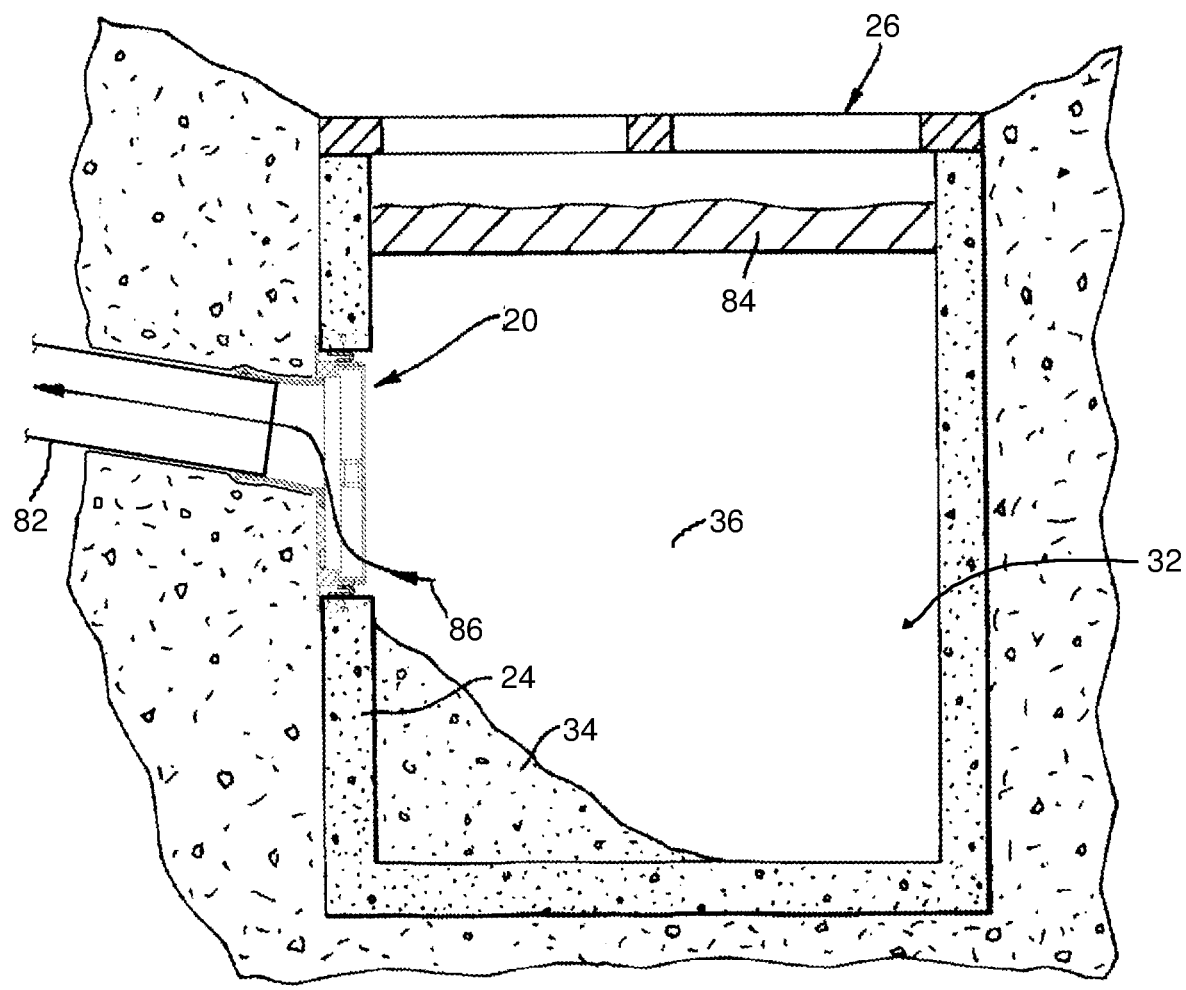
FIG. 16 is a cross-sectional view similar to FIG. 9, except that the outlet pipe is angled upwardly due to settlement of the soil around the catch basin due to an improper installation.

Preferably, the outlet pipe connector 80 may be sufficiently flexible to accommodate a degree of relative movement between the outlet pipe 82 and the catch basin 26, resulting from settling of the ground following installation, without cracking, breaking or shearing off of the catch basin trap 20. This is illustrated, by way of example, with reference to FIGS. 9, 15, and 16, which respectively show a level outlet pipe 82 coupled to the outlet pipe connector 80 following a proper installation (FIG. 9), the outlet pipe 82 exhibiting a downward deviation in its angle resulting from the settling of the ground following an improper installation (FIG. 15), and the outlet pipe 82 exhibiting an upward deviation in its angle resulting from the settling of the ground following an improper installation (FIG. 16). However, accommodating side to side deviations in the angle of the outlet pipe 82 after installation is also comprehended by the present invention.

Accordingly, a preferred outlet pipe connector 80 may be configured to accommodate a downward, upward, side to side, or combination thereof deviation in the angle of the outlet pipe 82 relative to its angle at installation, resulting from the settling of the ground following installation. Preferably, the outlet pipe connector 80 may accommodate an angular deviation of up to 7 degrees up, down, side to side, or combination thereof.

Figure 17:
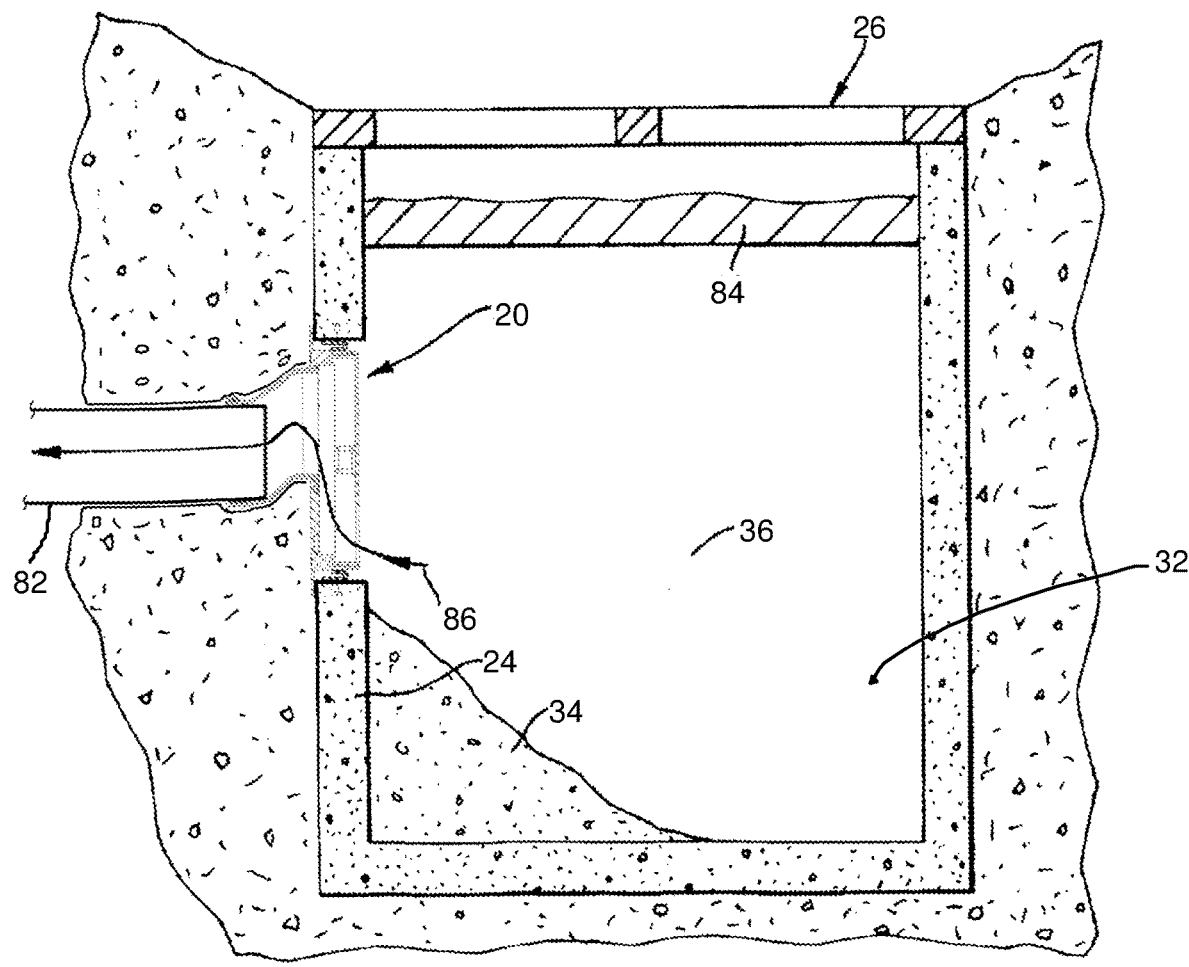
FIG. 17 is a cross-sectional view similar to FIG. 9, except that the outlet pipe is transposed downwardly due to settlement of the soil around the outlet pipe and/or the catch basin due to an improper installation.
Figure 18:
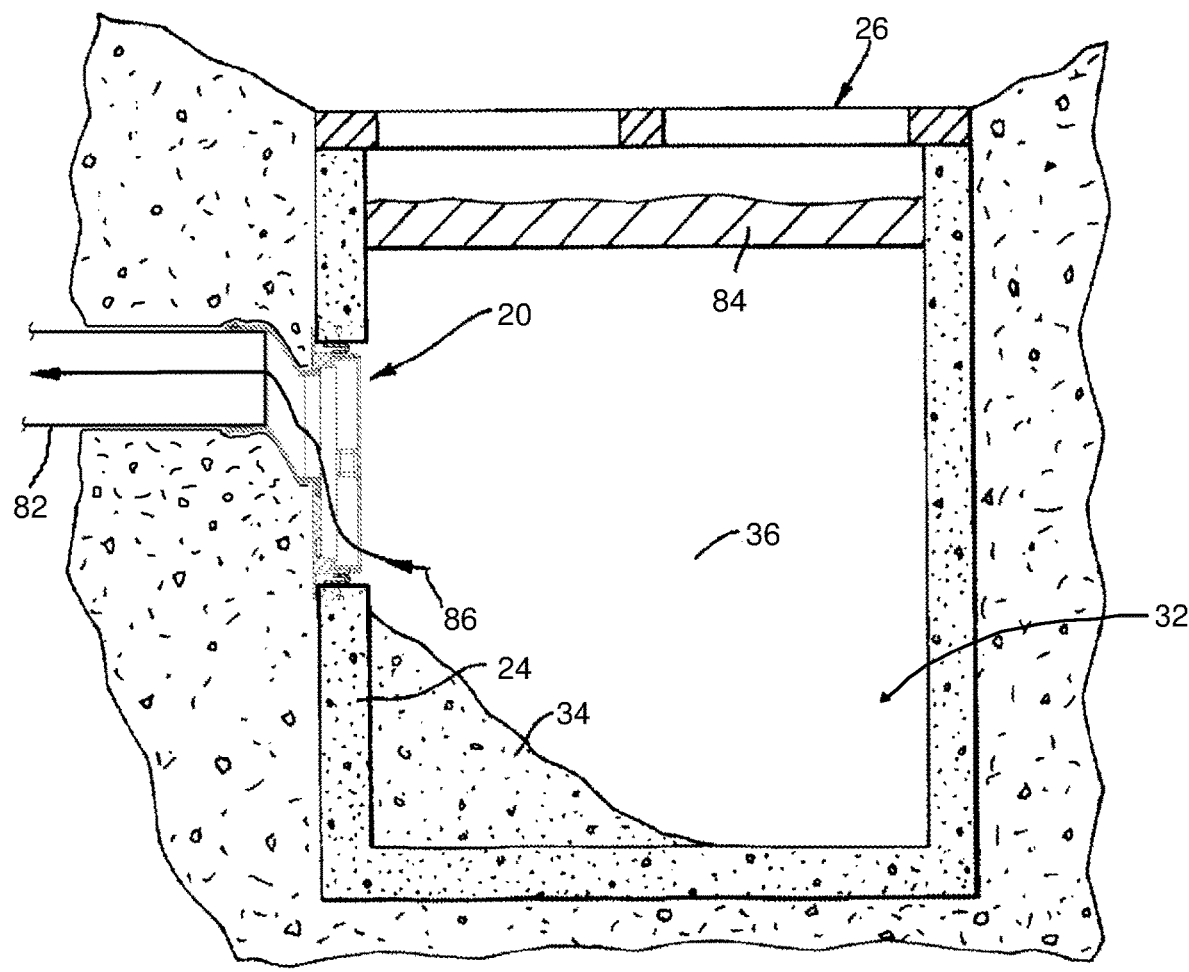
FIG. 18 is a cross-sectional view similar to FIG. 9, except that the outlet pipe is transposed upwardly due to settlement of the soil around the outlet pipe and/or the catch basin due to an improper installation.

Similarly, a preferred outlet pipe connector 80 may be configured to accommodate a downward, an upward, side to side, or combination thereof transposition of the outlet pipe 82 relative to its position at installation, resulting from the settling of the ground following installation. This is illustrated, by way of example, with reference to FIGS. 9, 17 and 18, which respectively show a level outlet pipe 82 coupled to the outlet pipe connector 80 following a proper installation (FIG. 9), the outlet pipe 82 exhibiting a downward deviation in its position resulting from the settling of the ground following an improper installation (FIG. 17), and the outlet pipe 82 exhibiting an upward deviation in its position resulting from the settling of the ground following an improper installation (FIG. 18). Preferably, the outlet pipe connector 80 may be configured to accommodate a transpositional deviation of up to 1 inch up, down, side to side, or combination thereof.

Similarly, a preferred outlet pipe connector 80 may be configured to accommodate a transpositional deviation of the outlet pipe 82 in a direction to or from the catch basin trap 20 (not shown), relative to its position at installation, resulting from the settling of the ground following installation.

Preferably, the outlet pipe connector 80 may be constructed from rubber, however other rubber-like materials may also be used. For example, the material of the flexible outlet pipe connector 80 may be ethylene propylene diene monomer (EPDM) rubber, or nitrile rubber. What is important is that the material allows the outlet pipe connector 80 to have a degree of flexibility sufficient to accommodate the desired angular and/or transpositional deviations suited to a particular application. In other words, a preferred outlet pipe connector 80 may be configured to allow it to deform from its native shape, for example by bending, compressing, and/or stretching, to accommodate, for example, a shifting of the outlet pipe 82 or the catch basin 26 after installation resulting from settling of the ground, without cracking, breaking or shearing off of the catch basin trap 20. Here the term native shape is intended to refer to the shape of the outlet pipe connector 80 in its resting state after being constructed, and prior to forces being applied to it that can deform its shape away from its native shape. In this way, shifting of the outlet pipe 82 during settling of the ground may be accommodated by constructing the outlet pipe connector 80 to allow it to deform from its native shape to a deformed shape that aligns with the angle and/or position of the outlet pipe 82 after settling of the ground, within a predetermined range of angles and positions of the outlet pipe 82 relative to the catch basin trap 20. Preferably, the construction of the outlet pipe connector 80 may follow standards defined in ASTM C923 and ASTM C1478, and provide for elongation of 350%, and a tensile strength of at least 1200 psi.

In addition to the outlet pipe connector 80 being configured to accommodate the angular and/or transpositional deviations of the outlet pipe 82 resulting from settling of the ground following installation, as discussed above, it is also contemplated that the outlet pipe connector 80 of the present invention may be useful in facilitating coupling of the catch basin trap 20 to outlet pipes 82 at installation. In other words, a preferred outlet pipe connector 80 may be configured to allow it to deform from its native shape, for example by bending, compressing, and/or stretching, to operably couple to an outlet pipe 82 that is placed at an angle or a position relative to the catch basin trap 20 which otherwise precludes coupling to the outlet pipe connector 80 when in its native shape. In this way, the coupling of the outlet pipe 82 to the outlet pipe connector 80 may be facilitated by deforming the outlet pipe connector 80 from its native shape to a deformed shape that aligns with the angle and/or position of the outlet pipe 82, within a predetermined range of angles and positions of the outlet pipe 82 relative to the catch basin trap 20. Accordingly, it is contemplated that the catch basin trap 20 may be mounted in the opening 22 in the side wall 24 of the catch basin 26, adjacent an inlet end of the outlet pipe 82 positioned outside of the catch basin 26, then the installer may deform the flexible outlet pipe connector 80 from its native shape towards a deformed shape to align the outlet end 96 of the flexible outlet pipe connector 80 with the inlet end of the outlet pipe 82, and slide the outlet end 96 of the flexible outlet pipe connector 80 over the inlet end of the outlet pipe 82 to form the watertight coupling. The watertight coupling may then be secured with, for example, a mechanical clamp, such as a ring gear clamp 104. The installer may deform the flexible outlet pipe connector 80 by bending, compressing, and/or stretching it, as mentioned above.

This may be advantageous for allowing an installer to stock, for example, one catch basin trap 20 which is capable of coupling to outlet pipes oriented within a range of predetermined angles relative to the catch basin 26, rather than several catch basin traps each of which only allow for coupling to an outlet pipe 82 oriented at one particular angle. For example, one installation may require the outlet pipe 82 to be level (FIG. 9), while another may require the outlet pipe 82 to be angled upwardly (FIG. 15), and another still may require the outlet pipe 82 to be angled downwardly (FIG. 16). In contrast to the present invention, a prior art catch basin trap is configured to couple to the outlet pipe 82 either straight on, or at a specific upward or downward angle. Thus an installer needs to stock three types of catch basin traps (i.e. one for coupling a level outlet pipe, one for coupling an upwardly angled outlet pipe, and one for coupling to a downwardly angled outlet pipe) if they wish to be able to handle the three types of installations. The outlet pipe connector 80 of the present invention also gives installers more flexibility in designing and constructing catch basin installations, since they are not limited to specific outlet pipe angles and/or positions, based on their particular stock of catch basin traps on a given day, which is currently the case with prior art catch basin traps.

Although, the examples of embodiments of the present invention illustrated in the drawings, for example FIG. 1, show the outlet pipe connector 82 extending straight out from the front side 28 of the outer trap member 38, the outlet pipe connector 82 may have a native shape that extends out at an angle (i.e. angled up, down, to the side, or a combination thereof), according to other embodiments of the invention.

The catch basin trap 20, described above, may be mounted in the opening 22 in the side wall 24 either with or without the inner trap member 40 secured to the outer trap member 38. In both cases, the outer trap member 38 (with or without the inner trap member 40 secured thereto) is pushed into the opening 22 in the side wall 24 from outside of the catch basin 26 until the mounting flange 88 engages the portion of the side wall 24 of the catch basin 26 surrounding the opening 22. Preferably, prior to pushing the catch basin trap 20 into the opening 22, a second seal member 110, which in this example is in the form of an annular rubber gasket, is mounted over the outer connecting wall 42 of the outer trap member 38 to provide a seal between the outer trap member 38 and the opening 22 in the side wall 24 when the outer connecting wall 42 is pushed into the opening 22. If the second seal member 110 is employed, it is preferably made of a resilient material configured to have an outer dimension larger than the inner dimension of the opening 22 in its non-deformed state, such that as the catch basin trap 20 is pushed into the opening 22, the second seal member 110 is deformed and compressed, to fill any space between the outer connecting wall 42 and the opening 22 to form a watertight seal. Preferably, a shoulder 112 is provided on the outer connecting wall 42 to ensure that the second seal member 110 stays in position and is not displaced as the outer trap member 38 is pushed into the opening 22 in the side wall 24.

Once fully inserted into the opening 22 through the side wall 24, the catch basin trap 20 (or at least the outer trap member 38) may preferably be temporarily held in place with butyl tape around the mounting flange 88 and frictional engagement between the second seal member 110 and the opening 22, which has been found to be sufficient to hold the catch basin trap 20 in place during shipping of the catch basin 26. Once the catch basin 26 is installed in its desired location, the force of the outlet pipe 82 connected to the outlet pipe connector 80 and the force of the back fill placed around the catch basin 26 press the catch basin trap 20 against the side wall 24 of the catch basin 26 with sufficient force to keep the catch basin trap 20 in place. Thus, the catch basin trap 20 does not require fasteners 92, mentioned above, or similar hardware to keep it in place. However, fastening the mounting flange 88 to the side wall 24 of the catch basin 26 by anchoring the fasteners 92 through the apertures 90 into anchors 94 may be desirable in certain installations. For example, fasteners 92 may be used to hold the catch basin trap 20 mounted on the catch basin during handling and transport to the desired location, and once installed in the ground, soil pressure will keep the catch basin trap 20 in the opening 22 in the side wall 24, with its mounting flange 88 pressed against the side wall 24 surrounding the opening 22 of the catch basin 26.

In one embodiment, the dimensions associated with a catch basin trap 20 suitable for a 20 inch diameter opening 22 cored into the side wall 24 of a catch basin 26 are as follows:

the outside diameter of the outer connecting wall 42 of the outer trap member 38 is 19.7 inches;
the outside diameter of mounting flange 88 is 24 inches;
the outside diameter of the inner connecting wall 44 of the inner trap member 40 is 19.5 inches;
the distance between back side 46, outer trap member 42 and back side 48 of inner trap member 40 is 6 inches;
the diameter of outlet opening 78 of the outer trap member 38 is 10 inches;
the diameter of the inlet opening 76 of the inner trap member 40 is 7.5 inches; and
the top of the inlet opening 76 of the inner trap member 40 is 2.8 inches lower than the bottom of the outlet opening 78 of the outer trap member 38;
the outlet pipe connector 80 extends from the front side 28 of the outer trap member 38 about 6 inches, and has a thickness of about 0.25 inches;
the outside diameter of the outlet pipe connector 80 is about 10.5 inches at the outlet end 96, and about 11 inches at the inlet end 98; and
the inside diameter of the outlet pipe connector 80 is about 10 inches at the outlet end 96, and about 10.5 inches at the inlet end 98.

While reference has been made to various preferred embodiments of the invention other variations, implementations, modifications, alterations and embodiments are comprehended by the broad scope of the appended claims. Some of these have been discussed in detail in this specification and others will be apparent to those skilled in the art. For example, it will be appreciated that the outer and/or inner connecting walls 42,44 need not be continuous. Rather, the outer and/or inner connecting walls 42,44 may include one or more discontinuous wall sections, or strut members, which extend between the back side 46 of the outer trap member 38 and the back side 48 of the inner trap member 40. In the event that the outer and/or inner connecting walls 42,44 are made discontinuous, provisions may be required to ensure that the outflow of the drainage water 36 from the catch basin 26 does not bypass the catch basin trap 20, but remains restricted to the water flow path 86. Furthermore, if it is desirable for the catch basin trap 20 to include the chamber 70 to provide a water plug preventing sewer gases from entering the catch basin 26 from the outlet pipe 82, additional provisions may be required to ensure that those sewer gases do not bypass the chamber 70. Such provisions may include for example, the use of appropriate seals and/or wall sections in the catch basin trap 20, which are within the knowledge of persons skilled in the art and can be readily determined without undue experimentation. Those of ordinary skill in the art having access to the teachings herein will recognize these additional variations, implementations, modifications, alterations and embodiments, all of which are within the scope of the present invention, which invention is limited only by the appended claims.

I claim:

1. A catch basin trap for mounting in an opening in a side wall of a catch basin, said catch basin trap comprising:
a body having a front side for facing outwardly to outside of said catch basin, and a back side for facing inwardly to inside of said catch basin, said body defining a chamber;
an inlet opening in said back side of said body for receiving drainage water from said inside of said catch basin;
an outlet opening in said front side of said body for discharging said drainage water to said outside of said catch basin;
a flexible outlet pipe connector extending outwardly from said outlet opening, configured for watertight coupling to an outlet pipe positioned outside of said catch basin; and a water flow path for said drainage water from said inside of said catch basin to said outlet pipe, passing through said inlet opening, said chamber, said outlet opening and said flexible outlet pipe connector.

2. The catch basin trap as claimed in claim 1, wherein said flexible outlet pipe connector is deformable from a native shape adapted for said watertight coupling to said outlet pipe at a first angle or a first position relative to said catch basin trap, to a deformed shape adapted for said watertight coupling to said outlet pipe at a second angle or a second position relative to said catch basin trap.

3. The catch basin trap as claimed in claim 2, wherein said second angle is 7 degrees or less from said first angle.

4. The catch basin trap as claimed in claim 2, wherein said second position is 1 inch or less from said first position.

5. The catch basin trap as claimed in claim 2, wherein said flexible outlet pipe connector is configured to allow a user to deform said flexible outlet pipe connector towards said deformed shape, to facilitate said watertight coupling, during installation of the catch basin trap.

6. The catch basin trap as claimed in claim 2, wherein said flexible outlet pipe connector is configured to allow movement of said outlet pipe relative to said catch basin trap to deform said flexible outlet pipe connector towards said deformed shape, to maintain said watertight coupling, after installation of the catch basin trap.

7. The catch basin trap as claimed in claim 6, wherein said movement of said outlet pipe relative to said catch basin trap results from settling of the ground after said installation of the catch basin trap.

8. The catch basin trap as claimed in claim 2, wherein said flexible outlet pipe connector is deformable from said native shape by bending, compressing, or stretching.

9. The catch basin trap as claimed in claim 1, wherein said flexible outlet pipe connector is configured for said watertight coupling to said outlet pipe at a plurality of predetermined angles of said outlet pipe relative to said catch basin trap.

10. The catch basin trap as claimed in claim 1, wherein said outlet pipe has an inlet end, and wherein said flexible outlet pipe connector is configured for said watertight coupling to said outlet pipe at a plurality of predetermined positions of said outlet pipe relative to said catch basin trap.

11. The catch basin trap as claimed in claim 1, wherein said flexible outlet pipe connector is adapted to accommodate an angular deviation of said outlet pipe relative to said catch basin trap resulting from settling of the ground after installation.

12. The catch basin trap as claimed in claim 11, wherein said angular deviation is 7 degrees or less.

13. The catch basin trap as claimed in claim 1, wherein said outlet pipe connector is adapted to accommodate a transpositional deviation of said outlet pipe relative to said catch basin trap resulting from settling of the ground after installation.

14. The catch basin trap as claimed in claim 13, wherein said transpositional deviation is 1 inch or less.

15. The catch basin trap as claimed in claim 1, wherein said flexible outlet pipe connector is formed from rubber, or rubber-like material.

16. The catch basin trap as claimed in claim 15, wherein said material has an elongation of at least 350%, and a tensile strength of at least 1,200 psi.

17. The catch basin trap as claimed in claim 1, wherein said flexible outlet pipe connector comprises a mechanical clamp configured to secure said watertight coupling of said outlet pipe connector to said outlet pipe.

18. The catch basin trap as claimed in claim 17, wherein said mechanical clamp is a ring gear clamp.

19. The catch basin trap as claimed in claim 17, wherein said flexible outlet pipe connector further comprises a retainer for retaining said mechanical clamp in position on said flexible outlet pipe connector.

20. The catch basin trap as claimed in claim 19, wherein said retainer is a channel formed in said flexible outlet pipe connector.

21. The catch basin trap as claimed in claim 17, wherein said flexible outlet pipe connector comprises a plurality of ridges positioned on an inner surface thereof adapted to grip the outlet pipe when said mechanical clamp is tightened on said flexible outlet pipe connector.

22. The catch basin trap as claimed in claim 1, wherein said flexible outlet pipe connector comprises a tapered section extending from said outlet opening towards an outlet end of said flexible outlet pipe connector.

23. The catch basin trap as claimed in claim 1, wherein said inlet opening is configured to restrict a flow of said drainage water through said catch basin trap to promote settlement of solid matter in said inside of said catch basin.

24. The catch basin trap as claimed in claim 23, wherein said inlet opening has a smaller cross-sectional area, as compared to a cross-sectional area of said outlet opening, to reduce a rate of flow of said drainage water along said water flow path.

25. The catch basin trap as claimed in claim 24, wherein said inner trap member further comprises at least one handle on said back side, to facilitate release of said inner trap member from said outer trap member.

26. The catch basin trap as claimed in claim 1, wherein said chamber is adapted to provide a water plug in said water flow path to prevent sewer gases from entering the catch basin from the outlet pipe.

27. The catch basin trap as claimed in claim 1, wherein said inlet opening is positioned relative to said outlet opening such that when said catch basin trap is mounted in said opening in said side wall, said inlet opening is lower than said outlet opening.

28. The catch basin trap as claimed in claim 1, further comprising a second seal member to form a watertight seal between said body and said opening in said side wall of said catch basin, when said catch basin trap is mounted in said opening.

29. The catch basin trap as claimed in claim 1, further comprising a mounting flange extending from said body for securing said catch basin trap in place in said opening in said side wall.

30. The catch basin trap as claimed in claim 29, further comprising at least one aperture sized and shaped to allow a fastener to be inserted therethrough to secure into said side wall.

31. The catch basin trap as claimed in claim 1, wherein said body comprises an inner trap member releasably securable to an outer trap member, said inner trap member comprising said back side for facing inwardly to said inside of said catch basin, and said outer trap member comprising said front side for facing outwardly to said outside of said catch basin, and said chamber is defined therebetween when said inner trap member is secured to said outer trap member.

32. The catch basin trap as claimed in claim 31, further comprising a first seal adapted to form a watertight seal between said inner trap member and said outer trap member when said inner trap member is releasably secured to said outer trap member.

33. The catch basin trap as claimed in claim 31, further comprising a plurality of pin and slot connections adapted to releasably secure said inner trap member to said outer trap member.

34. The catch basin trap as claimed in claim 33, wherein said outer trap member comprises an outer connecting wall extending from a back side of said outer trap member, and said inner trap member comprises an inner connecting wall extending from a back side of said inner trap member, and wherein one of said inner connecting wall and said outer connecting wall comprises a plurality of pins of said pin and slot connections, and the other of said inner connecting wall and said outer connecting wall comprises a plurality of matching slots of said pin and slot connections.

35. The catch basin trap as claimed in claim 1, wherein said flexible outlet pipe connector is attached to said front side of said body by an adhesive, a channel and tang connection, a ring gear clamp, or an expandable ring gear clamp.

36. The catch basin trap as claimed in claim 1, wherein said flexible outlet pipe connector has a free end configured to slide over an inlet end of said outlet pipe to form said watertight coupling.

37. A method of installing a catch basin trap, said method comprising the steps of:
    providing a catch basin trap for mounting in a side wall of a catch basin, said catch basin trap having a body defining a chamber, said body comprising a front side for facing outwardly from said catch basin, a back side for facing inwardly to inside of said catch basin, and a flexible outlet pipe connector extending outwardly from said front side of said body, said flexible outlet pipe connector being configured for watertight coupling to an outlet pipe positioned outside of said catch basin;
    mounting said catch basin trap in said opening in said side wall of said catch basin, adjacent an inlet end of said outlet pipe;
    deforming said flexible outlet pipe connector from a native shape towards a deformed shape to align said outlet end of said flexible outlet pipe connector with said inlet end of said outlet pipe; and
    sliding said outlet end of said flexible outlet pipe connector over said inlet end of said outlet pipe to form said watertight coupling.

38. The method as claimed in claim 37, further comprising securing said watertight coupling with a mechanical clamp.

39. The method as claimed in claim 37, wherein said deforming step comprises bending, compressing, or stretching said flexible outlet pipe connector.

\* \* \* \* \*